United States Patent [19]

Weber et al.

[11] Patent Number: 5,564,005
[45] Date of Patent: Oct. 8, 1996

[54] INTERACTIVE SYSTEM FOR PRODUCING, STORING AND RETRIEVING INFORMATION CORRELATED WITH A RECORDING OF AN EVENT

[75] Inventors: Karon A. Weber, San Francisco; Alex D. Poon, Mountain View; Thomas P. Moran, Palo Alto, all of Calif.

[73] Assignee: Xerox Corporation, Stamford, Conn.

[21] Appl. No.: 138,549

[22] Filed: Oct. 15, 1993

[51] Int. Cl.$^6$ .................................................. G06F 3/14
[52] U.S. Cl. ............................................................ 395/161
[58] Field of Search .................................. 395/161, 132, 395/100, 500; 364/237.1, 413.29, 926.1; 358/461; 360/22; 382/13, 43

[56] References Cited

U.S. PATENT DOCUMENTS

| | | | |
|---|---|---|---|
| 4,112,415 | 9/1978 | Hilbrink | 395/100 |
| 4,425,586 | 1/1984 | Miller | 358/335 |
| 4,577,240 | 3/1986 | Hedberg et al. | 360/22 |
| 4,724,495 | 2/1988 | Hedberg et al. | 360/22 |
| 4,841,387 | 6/1989 | Rindfuss | 360/72.1 |
| 4,924,387 | 5/1990 | Jeppesen | 364/409 |
| 5,012,334 | 4/1991 | Etra | 358/102 |
| 5,121,470 | 6/1992 | Trautman | 395/140 |
| 5,157,518 | 10/1992 | Ohtaki et al. | 358/461 |
| 5,172,281 | 12/1992 | Ardis et al. | 360/72.2 |
| 5,218,672 | 6/1993 | Morgan et al. | 395/162 |
| 5,233,520 | 8/1993 | Kretsch et al. | 364/413.29 |
| 5,375,226 | 12/1994 | Sano et al. | 395/500 |

FOREIGN PATENT DOCUMENTS

495612A2  7/1992  European Pat. Off. .

OTHER PUBLICATIONS

Catherine G. Wolf, James Rz. Rhyne and Laura K. Briggs, "Communication and Information Retrieval with a Pen-based Meeting Support Tool", *CSCW92 Proceedings*, Nov. 1992, pp. 322–329.

Debby Hindus and Chris Schmandt, "Ubiquitous Audio: Capturing Spontaneous Collaboration", *CSCW 92 Proceedings*, Nov. 1992, pp. 210–217.

Karon Weber and Alex Poon, "Marquee: A Tool for Real-Time Video Logging", CHI 94 Proceedings, Apr. 94, pp. 58–64.

Mann, Tom, "Non—linear Off–Line Editing for HDTV and Film", *Image Technology*, Dec. 1989, pp. 541–546.

(List continued on next page.)

*Primary Examiner*—Mark R. Powell
*Assistant Examiner*—Ruay Lian Ho
*Attorney, Agent, or Firm*—Judith C. Bares

[57] ABSTRACT

An interactive processor-controlled system for entering and storing user information about an event that is being concurrently recorded in real time correlates the user information to user-requested addresses, such as time values stored with the recorded signals. The system includes a recording device for producing signals indicating recorded event data that includes periodic addresses, each of which indicates a portion of the recorded signals. An address source, such as a clock, is connected for providing address values to both the processor and the recording device. Using a pen-based user interface in one embodiment of the system, the system user specifically requests an address value in order to correlate user information to the signals being concurrently recorded. In response to a request for an address, the system establishes a spatial region on the display, called a time zone, into which the system user may enter information, in the form of handwritten strokes, about the event. All information entered into a time zone is stored and correlated with the address value represented by the time zone, in effect creating a log of the recorded event that may be used to access the portions of the recorded signals. While time zones are created by the user in sequential time order, information can be entered in to time zones in any sequence, thereby facilitating editing and annotation of previously-entered information. The ability to correlate the recorded signals to keywords designated in the user-supplied information is also provided.

25 Claims, 21 Drawing Sheets

OTHER PUBLICATIONS

Aguierre Smith, T. and Davenport, G., "The Stratification System A Design Environment for Random Access Video", *Proceedings of the 3rd International Workshop on Network and Operating System Support for Digital Audio and Video*, San Diego, California, Nov. 1992.

Minneman, Scott L. and Harrison, Steve, R. "Where Were We: making and using near–synchronous, pre–narrative video", *Proceedings of the First ACM International Conference on Multimedia*, 1–6 Aug. 1993, Anaheim, CA, pp. 207–214."Indexing Transcripts: New Versions of Old Friends" in *The Recorder*, San Francisco, CA, Sep. 29, 1993, pp. 12 –13.

"New Hope for Pen Computing", San Francisco Examiner, San Francisco, CA, Jun. 13, 1993 at p. E1.

"New Software for Hand–Held PCs", San Francisco Chronicle, San Francisco, CA, Jun. 14, 1993 at p. C2.

"Software Helps Pen PCs", San Jose Mercury News, San Jose CA, Jun. 15, 1993 (page unknown).

Davis, Marc E., "Director's Workshop: Semantic Video Logging with Intelligent Icons", Position paper for AAAI–91 Intelligent Multimedia Interfaces Workshop, 1991, pp. (1) –(11). *AAAI–91 Intelligent Multimedia Interfaces Workshop.*

 Dot  *Fig. 15A*
 Horizontal Scratch  *Fig. 15B*
 Vertical Scratch  *Fig. 15C*
 Horizontal Line  *Fig. 15D*
 Vertical Line  *Fig. 15E*
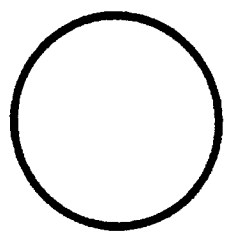 Circle  *Fig. 15F*
 Mini Circle  *Fig. 15G*

INTERACTIVE SYSTEM FOR PRODUCING, STORING AND RETRIEVING INFORMATION CORRELATED WITH A RECORDING OF AN EVENT

CROSS REFERENCE TO OTHER APPLICATIONS

The present invention is directly related to inventions that are the subject matter of concurrently filed, commonly assigned U.S. patent applications having the following serial numbers and titles: Ser. No. 08/138545, "Interactive Method and System For Producing Address-Correlated Information Using User-Specified Address Zones"; Ser. No. 08/138548, "Method For Creating Computationally-Significant Associations Among Uninterpreted Data in Graphically-Based Computing Systems", and Ser. No. 08/138817, "Method For Retrieving and Manipulating Computationally-Significant Associations Among Uninterpreted Data in Graphically-Based Computing Systems". Each of these patent applications is hereby incorporated by reference herein.

FIELD OF THE INVENTION

The present invention relates generally to processor-based data capture and access systems that correlate data with recorded signals, and more particularly to a processor-based interactive method of creating, correlating, storing, and accessing information about an event that is concurrently being recorded, or with an event that has been recorded, using user-specified time markers and spatially reusable objects that function as information designators such as key words or labels.

BACKGROUND

Many events in the political, business, engineering, medical, journalism, education and legal domains, among others, today are being recorded, and the recording of events, both video and audio, is likely to become even more useful in the future world of collaborative work environments. It is, therefore, increasingly important and necessary for a system user to have the ability to correlate user-produced notes or information about an event to the recorded signals of the event. In addition, the increasing proliferation of hand-held processor-based machines that use a stylus (or pen-like) device for capturing a user's input make such machines ideal candidates for use in taking notes about an event, replacing both the conventional pen and paper and keyboard modes of note-taking. As with many other processor-based systems, a well-designed user interface that both supports and enhances a person's natural style of note-taking is crucial to the ultimate utility and successful use of such a note-taking system.

Existing systems support note taking and correlation of notes to recorded signals in a variety of ways. Some are intended for use in a real-time environment while others are structured for use after an event has been recorded, i.e., as a "post-processing" step. Some have few or no user-interface features specifically designed for the note-taking, annotation or indexing process, while other user interfaces have special purpose features tailored to a specific application, such as the correlation of a legal deposition transcript to a video recording of the transcript. The discussion of some of these systems that follows highlights their basic features and disadvantages.

European patent application publication EP 0 495 612 by Lamming discloses a computer-based note-taking system integrated with an audio or video recording system. The computer presents a document editor style user interface to the user who either creates a new document or retrieves an existing document to which the user adds notes as a recording is made or played via the integrated audio or video recording system. As the user enters each note (mark or indicum), the indicum is added to the document and it is time stamped and stored in an indicumo-to-time-stamp index. The time stamps are not visible to the user; they are stored with the computer's internal representation of the indicia entered by the user. A video-frame time stamp function time stamps time code data received from the audio or video recorder and creates a time-stamp-to-time-code index. A browser function permits the user to retrieve sections of the recording using the indicia directly by selecting the indicia. The browser looks up the indicia in the first index to retrieve the time stamp, and looks up the time code of the recording in the second index using the time stamp, playing the section of the recording in the area indicated by the time code. EP 0 495 612 also discloses how time stamping the indicia may be applied to creating topic or key word data. By entering new, separate indicia spatially near a previously entered indicia that is a key word or topic whenever an idea or speaker or topic applies to the previously entered indicia, later selection of all of the marks spatially associated with a topic will result in all sections of the recording indexed by the time stamps of the respective indicia to be replayed.

U.S. Pat. No. 4,841,387, entitled "Arrangement for Recording and Indexing Information" and issued to Rindfuss, discloses a system for recording information relating to an event on a recording medium, such as an audio or video tape, and for indexing positions of handwritten notations made on a touch sensitive device and concerning the event to positions on the recorded medium in order to allow the user to identify portions of the handwritten notations for which review of the correlated material on the recorded medium is desired. In the recording mode, the device makes an audio recording of the event on a standard cassette tape. Simultaneously, the electronic touchpad senses the position of the user's handwritten notes on the writing surface, and provides this information to the microprocessor which correlates the record of the positions of the handwritten notations on each page with the position of the recorded information on the audio tape at corresponding instants in time. Real-time constrained correlation vectors representing rectangular areas of the display surface each containing a cohesive group of handwritten text are each combined with a tape position that correlates to the instant in time the handwriting within that area began.

U.S. Pat. No. 4,425,586 issued to Miller discloses a system that combines a video tape recorder with a computer in such a manner that these two components each automatically record and display where related information is stored in its own mechanism as well as in its counterpart mechanism, allowing the user to determine the location of all the corresponding data stored both on video tape and on a storage medium such as a diskette, by examining only one storage medium. Notes about the recorded event or document may be entered onto the diskette along with the automatic entry of the corresponding reel number and frame number of the video record and diskette and file address number of the computer storage medium. Another feature disclosed is the capability of the system to enter and display the time and date on both the video tape and diskette recording mediums as well as on both video monitors along with the data address location information.

U.S. Pat. No. 4,924,387 issued to Jeppeson discloses a computerized court reporting system which provides for periodically annotating the stroke record made by the user of a court stenographic machine with a time stamp from a system clock while simultaneously sending a time stamp to a recording system making a video and audio recording of the testimony. The logic of a control system determines automatically when to time stamp the stroke record and permits the user to trigger a control function to annotate the video recording with automatic "on the record" and "off the record" messages with associated time stamps.

These real-time data correlation and access systems have several similar disadvantages. The user's ability to index notes to the recording is entirely controlled through the indicia, or notes, the user has entered in a document, since the time stamps or positions captured are those made at the time the notes are entered. Each system assumes, therefore, that the time of entry of a note sufficiently corresponds with the time or position of the recording to provide an adequate index into the recording. In the case of U.S. Pat. No. 4,924,387, this provides an adequate indexing structure since the stroke record made is intended to be a verbatim transcription of the verbal testimony made in a courtroom. In the case of EP 0 495 612, however, where a verbatim transcription of the event may not be the note-taker's intention, such an assumption does not allow for the later, real-time augmentation of previously entered notes, while still recording, with additional notes related to the previously entered notes, since the later notes will be time stamped with the time they were entered rather than with the time of the material to which they relate or are relevant. In the case of the system disclosed by Rindfuss, notes may be entered later, but the later-entered notes will be correlated with the position of the tape at the time the later notes were entered, rather than with the position on the recording of the material to which they relate or are relevant. In the case of the system disclosed by Miller, notes added to the diskette record of the event at a later time are entered entirely during a post-processing phase, and not during the real-time recording of the event. In some of these systems, neither time stamps nor tape positions are visible to the user, and so the temporal or spatial context of the entered indicia is not available to the user to enhance the retrieval function. In addition, in EP 0 495 612 the function provided for creating topics or key words from the entered indicia may be practically limited to one display "page" or screen unless the user reenters the topic or key word on a second screen or scrolls between screens to add a mark to a previously entered topic or key word. As with augmentation of notes in general, there is no facility for associating a key word or topic name created at a later time with notes entered earlier. Finally, no user interface design is explicitly suggested in the note-taking systems for facilitating or enhancing a user's personal note-taking style or for accommodating the note-taking function to a variety of applications.

Existing post-processing (non-real-time) annotation systems in the field of post-production video editing provide for the creation of annotations about scenes correlated with "in" and "out" time codes identifying the scenes on a video recording. U.S. Pat. No. 5,218,672 is an example of such a system. It is disclosed there that scene descriptions may be revised after initial creation, but the correlation of the annotations are confined temporally to the identified scenes. There is no provision for grouping one scene description with other related scene descriptions.

In the post-processing system for the correlation of legal depositions with video recordings thereof disclosed in U.S. Pat. No. 5,172,281, a time code number is assigned by an operator of the system to both the computer transcript and the videotape segment where each question/answer passage begins. The location of individual words in the transcript may also be correlated with their corresponding position in the video recording. However, the system does not appear to provide for the entry of notes or annotations.

As can be seen from the discussion of the deficiencies in existing systems, these methods and systems require a user to adapt his or her natural note-taking process, which may be both temporally linear and non-linear with respect to the perception and recording of the event, to requirements and restrictions imposed by each respective implementation and they fall short of facilitating and enhancing a person's personal note-taking process while still providing accurate access to recorded information. In the case of video and audio logging tools, exclusively post-processing systems are inadequate for generating notes about relationships between recorded segments, and are time consuming because they require review of the entire tape in order to generate an index. Automatic indexing of video and audio notes by system time stamping of key- or handwritten strokes or automatic detection of speaker voice changes do not provide adequate context markers for the recorded signals or do not permit user control of the amount of detail to be captured. For example, an index created on the basis of speaker segmentation of the material would tell who was speaking but not the substance of the talk.

SUMMARY OF THE INVENTION

The system of the present invention provides an advancement over the existing systems described above by providing a very flexible note-taking structure and user interface that complements diverse personal note-taking styles and application needs, thereby enhancing its general utility. The invention recognizes, moreover, that the temporal or spatial sequencing of information is itself often a significant clue to the content of the information and may aid a user in recalling memories of or retrieving recorded information from a perceived event, and so the present invention makes user-entered information continuously available for presentation to, and modification and review by, a user.

In an environment where a recording of the event is being made simultaneously, the user may modify his or her note-taking style to complement and make easier the later retrieval of the information being recorded. In addition, the present invention produces a novel data structure that organizes the user's own information in handwritten form (i.e., the notes), without restriction as to the amount of that information or when it is entered, so that it is accurately correlated with the "address" of the recorded signals of the event. As used herein, the "address" of the recorded signals of the event refers to the measurement dimension used to locate the recorded signals on the recording medium being used. For example, in the case of a video recorded signal, a video frame number or a clock time are typically used to reference the location of the video segment on the video recording medium. In the case of an audio recorded signal, a clock time, or a tape position as provided by a counter in the audio recording device, may be used to denote the location of a portion of the recorded audio signal on the audio recording medium. Thus, references throughout this specification to "time" as the recorded signal address are to be understood as also including other suitable measurement dimensions or parameters.

In addition, the present invention, contrary to existing systems, recognizes that correlating notes with the recorded event signals solely through the use of the time that a user entered the notes, limits the user's ability to build a coherent set of notes of the event as a whole throughout the note-taking process. Therefore, the system of the present invention provides the user with exclusive control of when an entry measurement parameter, such as time, is associated with a body of notes by requiring the user to indicate an action when the measurement parameter is desired, thereby signaling a beginning measurement point to which all subsequent notes will be associated until the next action signaling a beginning measurement point is received. In the user interface, this signal creates a spatial region of the display known as a "time zone" (or position zone, or other address zone, if a measurement parameter other than time is being used.) Further, the present invention provides the user with the ability to modify notes previously entered without regard to when the modifications are made or where they are located on the recording medium by placing additional notes in the spatial region of the time zone.

Another important feature of the present invention is the ability to mark and index the user-produced information with special information designators which can later be used as access mechanisms into both the notes and the correlated recorded signals. These information designators, examples of which are key words or labels or any other marker or pointer to information, identify specific concepts in the user-produced information for which the user wants to have later access. An information designator is treated as an object that is easily created and reused and this novel implementation both in the user interface and data structure of the present invention provides a very flexible and powerful indexing tool into the recorded signals, in addition to the access provided by the recorded medium's address parameter.

These features make the system of the present invention an effective video and audio logging tool. Because the amount of detail that may be captured for a particular time on an associated recorded medium is not restricted in any way, a richer set of annotations may be made while the video is being recorded in real time than is typically allowed in previous systems. The time zone and reusable information designator object features provide for treating the event as a whole by permitting later but still real-time augmentation or modification of previously made notes. This relieves the note-taker of many of the pressures typically associated with taking notes in real time.

Moreover, it is another significant advantage that the system of the present invention operates in both real-time and post-processing environments. This feature recognizes that note-taking as a human activity is typically an iterative process. The output data structure (e.g., the video log), produced by the system of the present invention during a real-time note-taking session while the event is being recorded, itself may be further modified and augmented, by the same user or by one or more different users, during a post-processing review session, thereby facilitating and potentially reducing the time involved in the post-processing session.

Therefore, in accordance with the present invention, there is provided a processor-controlled system for correlating event data being recorded in real time to event information entered into the system by a system user. The system includes input circuitry connected to a user input device for producing signals indicating actions of a system user; output circuitry connected to a display having a display area for presenting images; and a processor connected for receiving the signals from the input circuitry, and connected for providing images to the output circuitry. The system also includes a recording device in communication with a storage medium for producing a plurality of signals indicating recorded event data about an event for storage on the storage medium. The recording device is currently producing the plurality of signals indicating the recorded event data and storing the signals on the storage medium. An address source is connected for simultaneously providing address data items to the processor of the system and to the recording device. The recording device stores the plurality of signals indicating the recorded event data on the storage medium so that a recording address value of each address data item provided by the address source indicates a portion of the recorded event data. The system also includes memory for storing data including instruction data indicating instructions the processor executes.

The processor is further connected for accessing the data stored in the memory. The processor, in executing the instructions, responds to a first signal from the user input device indicating a request from the system user to obtain a user-requested address value from the address source. The processor obtains the user-requested address value by accessing the address source to obtain an address data item indicating the user-requested address value; and then provides image definition data defining a first image to the output circuitry connected to the display so that the display presents the first image in the display area. The first image includes an address zone display feature positioned at an address marking location in the display area so that the address zone display feature is perceived as marking a spatial region in the display area. The first image also includes display features representing the user-requested address value positioned in the spatial region so that the user-requested address value is perceived as being associated with the spatial region. The address data item and the address marking location are stored in an address zone data structure in the memory of the system represented by the spatial region so that the address marking location indicates the address data item.

The processor, further in executing the instructions, responds to a second signal from the user input device indicating user-produced event data indicating information entered in a spatial region location in the spatial region in the display area by displaying a second image in the spatial region of the display area indicated by the spatial region location and including display features representing the user-produced event data entered by the system user. In this aspect of the system of the present invention, all of the user-produced event data entered by the system user within the spatial region marked in the display area is stored in the address zone data structure determined to have the user-requested address value representing the address marking location of the spatial region. The user-requested event data is thereby correlated with the portion of the recorded event data indicated by the recording address value simultaneously provided to the recording device by the address source.

In accordance with the present invention, the system may be configured to operate in a post-processing environment so that an event that has already been recorded is the event about which a log is being constructed according to the present invention. The event that has already been recorded is stored on a storage medium as a plurality of signals indicating recorded event data about the event. In this aspect of the invention, the system includes an output device for presenting the previously recorded signals thereon to the system user. This output device is in communication with the storage medium including the plurality of signals indicating recorded event data about the event. The output device is connected for providing a plurality of address data items to the processor of the system as user-requested address values; each address data item is a recording address value indicating a portion of the recorded event data. Preferably, the plurality of signals indicating the recorded event data includes the plurality of address data items, but the output device may itself generate them as the plurality of signals is being presented by the output device.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts and acts.

BRIEF DESCRIPTION OF THE DRAWINGS

FIGS. 15A through 15G illustrate the valid handwritten gestures detected by the system of the illustrated embodiment of the present invention.

Figure 1:
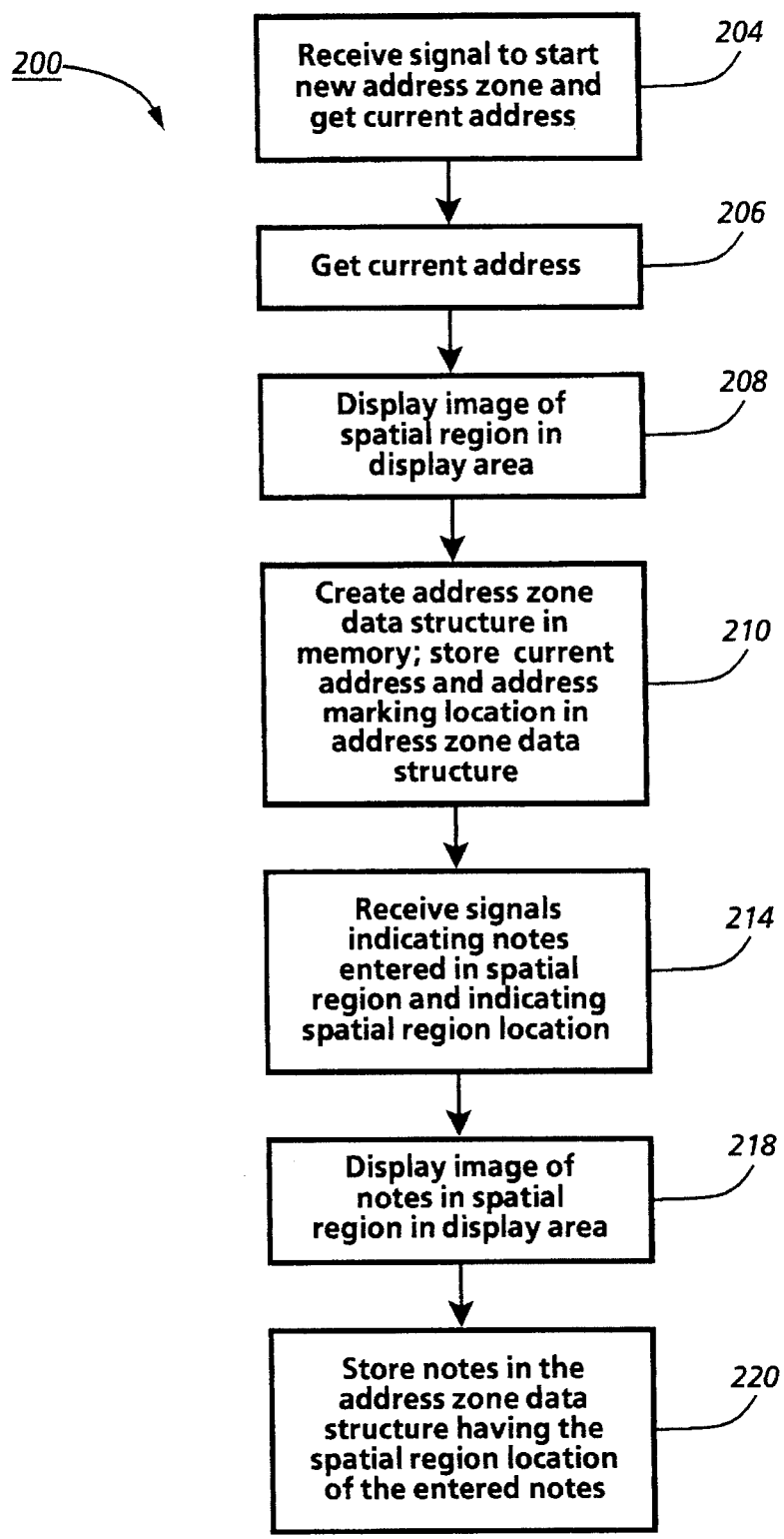
FIG. 1 is a flow chart illustrating creating address zones and entering user-produced event data according to the present invention.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF THE ILLUSTRATED EMBODIMENTS

Table 1: Detailed Description Table of Contents
  A. Conceptual framework and definitions.
  B. The system configurations of the present invention.
  C. Description of the system processing of the present invention.
    1. Storing information in address zones.
      a. Creating an address zone and entering information therein.
      b. The address zone data structure.
      c. Creating an information designator and associating it with an address zone.
      d. The information designator data structure.
Table 1: Detailed Description Table of Contents—continued
      e. Entering notes "out of order" in time zones.
      f. Recognizing information designators for retrieval purposes.
      g. Retrieving information from the data structures.
    2. The user interface of the present invention.
      a. The screen display layout and features supporting the creation of time zones and entering notes.

b. Features supporting creating and using information designators.
c. Features supporting the operation of the output presentation (e.g., recording) device.
d. Input stroke processing.

A. Conceptual framework and definitions.

The present invention describes steps for operating a machine including a processor, and to processing electrical or other physical signals to produce other desired physical signals. The detailed descriptions which follow are presented largely in terms of display images and symbolic representations of operations of data within the memory of the display system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. Apart from supplying certain signals to the machine or system, the capability of a human user is neither necessary nor desirable in the operations described herein which form part of the present invention. In addition, the algorithmic descriptions presented herein of the acts of the present invention for operating a system are not inherently related to any particular processor, machine, or other apparatus. Useful machines for performing the operations of the present invention include general purpose digital computers or other similar devices configured as described below and in the claims.

The system of the present invention may be specially constructed for the required purposes or it may comprise a general purpose computer selectively activated or reconfigured by a computer program stored in the computer. In particular, various general purpose machines may be used with programs in accordance with the teachings herein, or it may prove more convenient to construct more specialized apparatus to perform the required acts of the system. The required structure for a variety of these machines will appear from the description given below.

Preliminary to describing the embodiments of the claimed invention illustrated in the accompanying drawings, the terms defined below have the meanings indicated throughout this specification and in the claims.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form.

An "item of data" or a "data item" is a quantity of data that a processor can access or otherwise operate on as a unit. For example, an eight-bit byte is a data item in many data processing systems. Data can be combined into a "data structure". A "data structure" is any combination of interrelated data. A data structure may also include other data structures.

A "processor-controlled machine" or "processor" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system that can store data, and may include local and remote memory and input/output devices. An example of memory is a storage medium access device with a data storage medium that it can access.

A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data. In another example, within a data structure, when a first item of data includes a pointer or other information related to the location of a second item of data in the data structure, the first item of data indicates the second item of data. Thus, in the context of the present invention, when the event data entered by the user is stored in the output data structure, it is stored so that the time data item indicates, or points to, the event data, and the event data may be obtained from the time data item.

An "image" is a pattern of light. An image may include characters, words, and text as well as other features such as graphics. An image may be divided into image "segments," each of which is itself an image. A segment of an image may be of any size up to and including the whole image. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image.

Data "defines" an image when the data includes sufficient information to directly produce the image, such as by presenting the image on a display. Data defining an image will also be referred to herein as an "image definition" or "image definition data". For example, a two-dimensional array is an image definition that can define all or any part of an image, with each item of data in the array providing a value indicating the color of a respective location of the image. Each such image location is typically called a "pixel", and the two-dimensional array of data is typically called "image pixel data" or an "image pixel data structure", each item of data in the array providing a value, called a "pixel value", indicating the color of an image location. While image pixel data is the most common type of image definition data, other image definitions, such as vector list data, are intended to be included within the meaning of data defining an image.

The term "display feature" refers to any human perception produced by a display in a processor-controlled machine or display system. A "display object" or "object" is a display feature that is perceptible as a coherent unity. A display object "includes" a display feature if presentation of the display object can produce perception of the display feature. A "shape" is a display object that has a distinguishable outline; for example, a circular display object is a shape. A shape having a bounded area may be called a "region". An image "includes" a display feature or object if presentation of the image can produce perception of the feature or object. For example, the first image produced by the system of the present invention "includes" a display feature representing the time when the machine user can perceive the time from the display feature presented. Similarly, the first image includes display features representing the time zone region when the machine user can perceive the time zone region from the combined location of the display features representing the time and the display features representing the time zone beginning mark, such as, for example, by the solid black line together with the time shown below it in FIG. 2.

A "workspace" as used herein is a display region within which other display features appear to have respective relative positions, and "presenting" a workspace that includes plural display features produces the human perceptions of the display features in respective positions relative to each other. A window is an example of a workspace.

A common characteristic of processor-controlled machines and display systems operated by the system of the present invention is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, the display feature perceived as the time in an image may represent one or more items of data in a data structure that have a value or values indicating the time.

The mapping of one or more items of data to a display feature or object is performed by an "operation" which is used herein to mean a set of instructions (instruction data items) accessible and executable by the processor in a display system, defining the mapping relationship or function between one or more items of data (an input of the operation) and a display feature or object in an image (an output of the operation). An operation "produces" a display feature or object in an image when the operation begins without the data defining the display feature or object in the image and performing the operation results in the data defining the display feature or object in the image. When the operation uses items of data as input to produce data defining a display feature or object in an image, the display feature or object is "produced from" those input data items. An operation "modifies" an item of data that has one of a number of values when it changes the data item to a data item that has a different value.

The system of the present invention permits a system user to interactively produce stored information that is correlated with an "address". As noted earlier, the "address" refers to a measurement dimension used to identify a portion of the stored information. When the stored information is being correlated with recorded signals, the address typically refers to the location of the recorded signals on the storage medium storing the recorded signals. However, the system of the present information are not limited to correlating information with recorded signals, and may be used in any situation where later access to the stored information would be facilitated by correlation with an address, and by having an access mechanism as provided by the "information designators", described in more detail below. Generally, but not exclusively, when the system user is producing stored information related to a linear "event" occurring sequentially in time, the address used in the correlation of the stored information with the event will be that of time. Any other suitable dimension, measurement, or address may be used for the particular situation.

The stored information produced interactively by the system user of the system of the present invention may be about an "event" that the user is perceiving. The user will be able to correlate the stored information to the event's real time, as measured by a clock connected for providing time data to the system, or to some other dimension or measurement of the event. An "event" as used herein is any series of stimuli perceivable by a human. The stimuli may include visual, auditory, tactile, or olfactory stimuli, and they may originate from a human or machine source. For example, the event may be a live concert, or the playing of an audio recording on a tape or compact disk player. The event may also be a business meeting, the reading of a document, or a computer-based animation being executed on a computer. The event may also be a movie or television program, or a medical operation, or a legal deposition, or a fire, or a presidential speech, or a town meeting. It is even contemplated that in some situations, the system of the present invention may be useful for recording information about the user's memory of an event.

The term "zone" is used to mean a spatial region on the display that is distinguished from adjacent parts of the display by a distinctive display feature. The zone is perceivable to the system user as a single unit that is associated with a single address (e.g., time), and may be referred to variously herein as a "time zone", a "spatial region", or an "address zone". An "address zone data structure" is the collection of data items in memory that is represented by an address zone in the display area, and an address zone data structure indicates a display location, called an "address display location" included in the data structure from which the location of the spatial region in the display area may be computationally derived.

One novel and significant feature of the present invention is that the correlation of the address to the stored information is entirely under the control of the system user, and is not subject to the restrictions imposed by a correlation mechanism that automatically correlates a user action with an address. The system user requests a "user-requested address value" from the address source to establish a correlation between the stored information in an address zone data structure represented by a spatial region and an address value. For example, when the address source is a clock source, the user-requested address value is a time value, and the system user determines when to correlate the stored information with a time value.

An "information designator" is a data item that may be created by the system user to establish a correlation between the information in a first address zone with the information in a second address zone so that a the system user may retrieve information designator information related to a particular address zone. An information designator is stored in an "information designator data structure". Examples of information designators include, but are not limited to, key words, labels, identifiers, and graphical representations of information. An information designator may also function as a type of index into the address zone data structure, in order to permit a system user to correlate the substance of the information entered into a first address zone with either information entered in other address zones, or with the user-requested address value stored in the address zone data structure represented by the address zone into which the information designator is entered. The extent of the correlation and indexing permitted between the information designator data structure and the address zone data structure is dependent on the particular implementation of the system of the present invention. The variety of implementations will be explained in more detail below in the discussion accompanying the data structures. An information designator may also be referred to herein as a "key object", and the information designator data structure may be referred to as a "key object data structure".

The term "stored information" refers to any information the user enters in an address zone, including information designators, for storage in the address zone data structure. Stored information is also referred to herein as "user-produced event data". An example of stored information is commonly and generically referred to as "notes", and a useful implementation of the present invention that may be used in a wide variety of situations is in the form of a system for supporting note-taking. Stored information, or notes, may be entered using a variety of conventional user input device or devices. When the user input device is a keyboard or other character generating device, the user-produced event data may be entered as character data. In the illustrated embodiment described below, the user input device is a "stoke inputting device", such as a stylus or other pen-like device, capable of producing "strokes" by interacting with the surface of a display. A "stroke" is defined herein as a list of pixels (picture elements).

B. The system configurations of the present invention.

Figure 23:
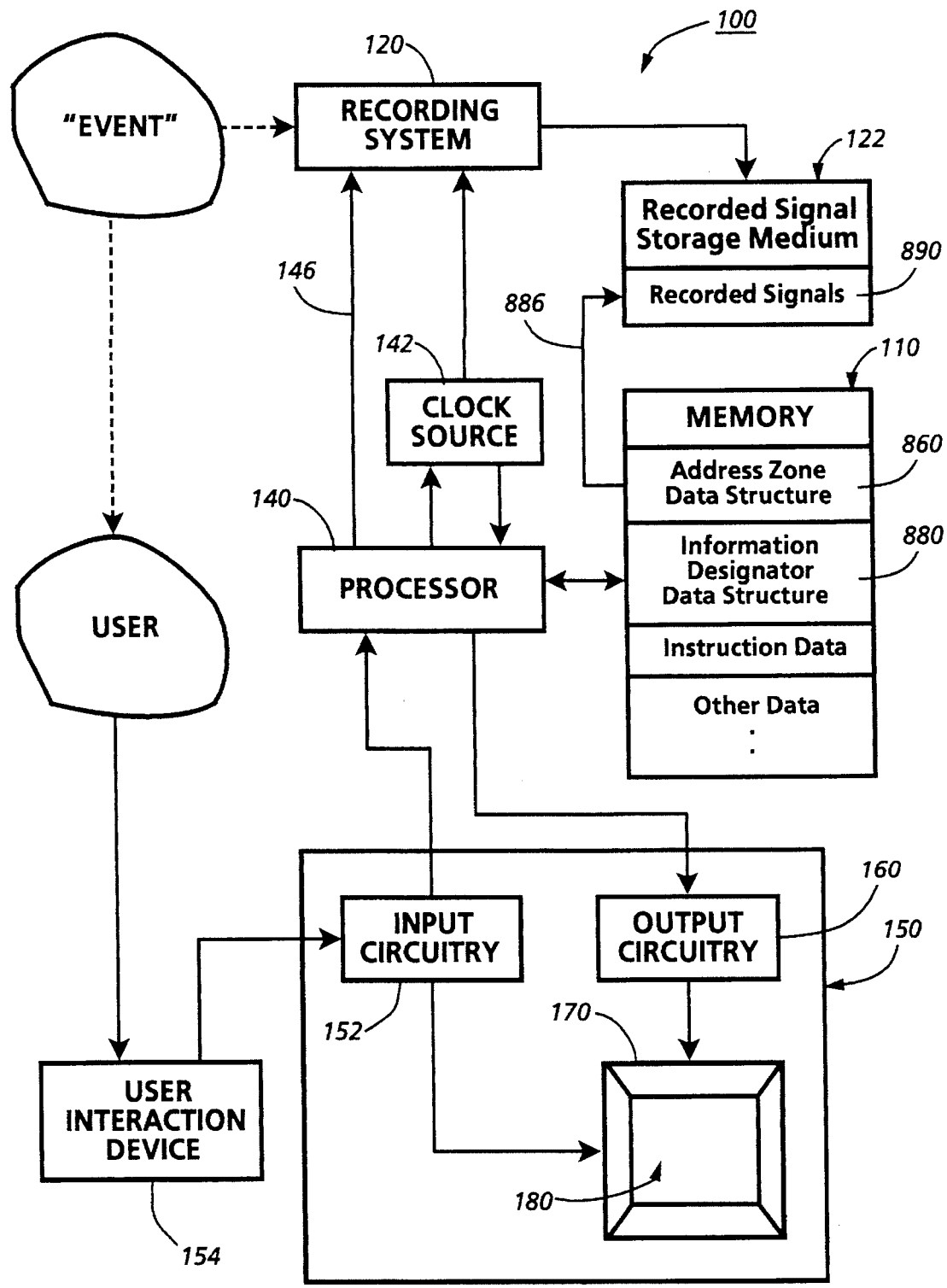
FIG. 23 is a simplified block diagram illustrating the system configuration of the present invention for correlating user-produced event data with concurrently recorded signals in accordance with this invention.

The processor-controlled system of the present invention has the common components, characteristics, and configuration of system 100 illustrated in FIG. 23. System 100 includes input circuitry 152 for receiving input "request" signals from user interaction device 154 indicating image display requests. An image display request may include a request for an operation and information identifying the requested operation, wherein the signal or signals indicate one or more actions by a system user intended to cause performance of the operation. An operation is performed by the system "in response" to a request when the signals received are for indicating a valid request for a valid operation and for causing the operation to be performed. Signals indicating a single complete request may include a combination of any number of actions indicated by the user necessary for indicating a valid request for a valid operation and for causing the operation to be performed. Signals indicating user actions may also include signals indicating the selection or movement of a display object visible to the user in display area 180, signals indicating requests that result in operations being performed by processor 140, and signals that result in processor 140 providing data defining an image to output circuitry 160 for display in display area 180.

User interaction device 154 may include any one of a variety of input devices controllable by a human user that produces signals of the type needed by the system of the present invention. For example, user interaction device 154 may include a pointing and gesturing device to indicate actions, gestures, and strokes such as those produced when making handwriting gestures; a stylus or pen-like device are examples of a suitable user interaction device. Devices such as a mouse and a trackball may also be suitable for indicating actions, gestures, and strokes. The pointing device has circuitry (not shown) for controlling the interaction between the system user and display features and objects presented on display device 170. For example, the pointing device may be a pen-like or stylus device that can be moved over the display surface display area 180. In the case of a pen-like or stylus device, there may be a pressure sensitive tip switch (not shown) which results in signals being sent through input circuitry 152 when the user presses the tip switch against display area 180, such as, for example, when the system user uses the stylus to make gestures in display area 180. The system of the present invention may be implemented in a manner to receive signals indicating a display request from any of these user interaction devices. Processor 140 is connected for receiving the signals from input circuitry 152. While the illustrated embodiment of the present invention is described with reference to a stylus input device, a conventional keyboard device may be used to indicate signals in place of the strokes interpreted as gestures described below, and to provide character input in place of strokes intended as user-produced event data.

With continued reference to FIG. 23, system 100 also includes memory 110 for storing data. Processor 140 is connected for accessing the data stored in memory 110, and for providing data for storing in memory 110. Memory 110 stores instruction data indicating instructions the processor executes, including the instruction data indicating the instructions for operating system 100 according to the system of the present invention. Memory 110 also stores the address zone data structure 860 and the information designator data structure 880.

Figure 2:
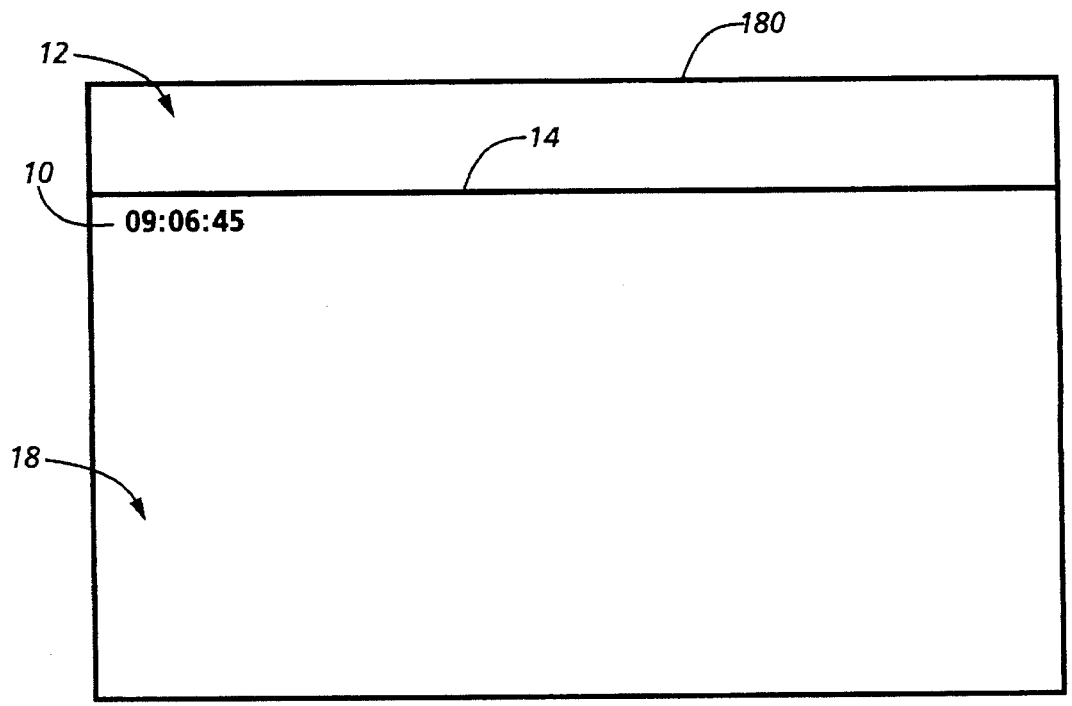
FIG. 2 is a display screen produced in response to a request from a system user t to create an address zone according to the steps shown in FIG. 1.
Figure 13:
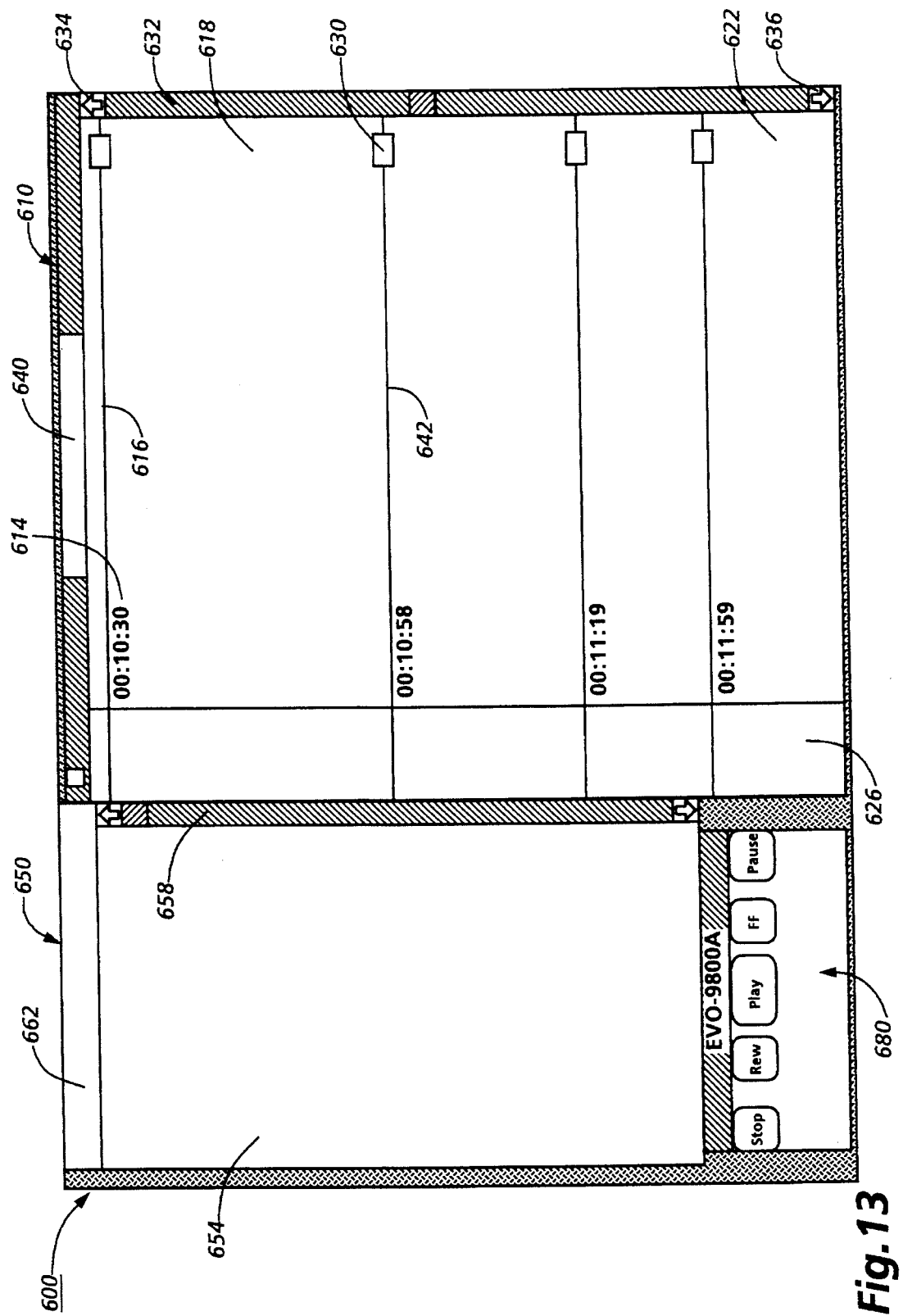
FIG. 13 is a display screen illustrating the display components of the user interface provided with the system of the present invention.

Processor 140 is also connected for providing data defining an image, for example the images in display area 180 shown in FIGS. 2 and 13, to output circuitry 160 for presentation on display device 170 in display area 180. As noted earlier, with respect to all circuitry components, any two components of circuitry are "connected" when there is a combination of circuitry that can transfer data from one of the components to the other. Processor 140 is further connected for providing data defining images, produced according to the system of the present invention, to output circuitry 160 for presentation on display 170 in display area 180. Output circuitry 160, input circuitry 152 and display 170 may be physically embodied in one device 150, such as in flat tablet display having an attached stylus as user interaction device 154. Alternatively, processor 140 and memory 110 may also be included within physical device 150, such as in a small, hand-held personal digital assistant (PDA) machine having an attached stylus as user interaction device 154.

System 100 also includes recording system 120 which is capable of recording some human perceivable aspect of an event to produce a plurality of signals on recorded signal storage medium 122. Processor 140 is connected to recording system 120 via interface 146, which enables processor 140 to control the operation of recording system 120. Interface 146 may be any conventional interface for translating the signals from processor 140 for controlling the operation of recording system 120 into signals understood by recording system 120. Recording system 120 may optionally include an output presentation subsystem 130 (FIG. 24) for presenting the recorded signals stored on recorded signal storage medium 122.

A measurement or addressing device 142, labeled as a "clock source" in FIG. 23, is also included in system 100. Measurement or addressing device 142 is capable of measuring or specifying an addressing mechanism by which the recorded signals 890 are recorded on recorded signal storage medium 122 by recording system 120. For example, in the case of a video recording system, measurement device 142 is a clock source which provides periodic time stamps indicating when recorded signals 890 are recorded on recorded signal storage medium 122. Alternatively, measurement device 142 may be a frame counter in the video environment, or a tape position counter in the audio environment, if time is not used by recording system 120. Clock source 142 may be physically part of a computer that includes processor 140, or may be physically part of recording system 120 and connected to processor 140 for providing time, or other suitable addressing, signals to processor 140 when requested.

The actual manner in which the physical hardware components of system 100 are connected may vary, and may include hardwired physical connections between some or all of the components, connections over wired or wireless communications facilities, such as through remote or local communications networks and infrared and radio connections. For example, memory 110 may include memory that is physically connected to processor 140 as local memory, or that is remotely accessible to processor 140 by means of a wired or wireless communications facility. Thus, when it is described below that the system causes processor 140 to access a particular data item, that data item may be stored in a memory device that is remotely located from system 100 but which is accessible to processor 140 by means of the appropriate connections. It is further of importance to note that the range of the physical size of system 100 may include a small desktop, laptop, or pocket-sized or smaller device to larger more conventionally sized systems such as those including personal computers or workstations, or even to large electronic white board applications. It is intended that the system of the present invention include all systems in this physical size range.

Figure 24:
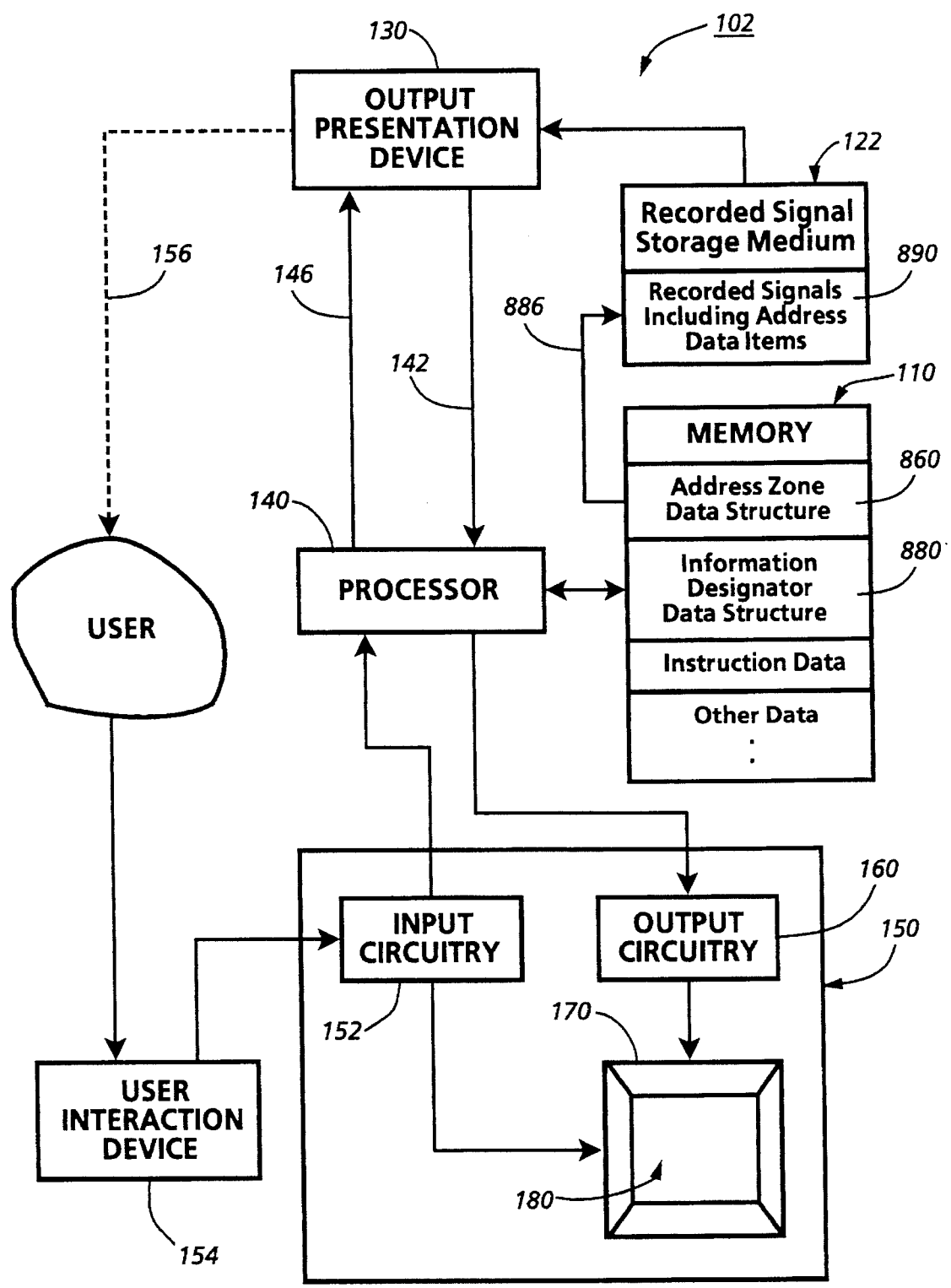
FIG. 24 is a simplified block diagram illustrating the system configuration of the present invention for correlating user-produced event data with previously recorded signals in accordance with this invention.

The system may be configured to operate in a post-processing environment so that an event that has already been recorded is the event about which a log is being constructed according to the present invention. FIG. 24 illustrates the system configuration of system 102 for the post-processing environment. The components of system 102 that are similar to those of system 100 have like reference numerals and are described with respect to the components of system 100 in FIG. 23; these identical components will not be discussed further here. In the post-processing environment, the event that has already been recorded is stored on a storage medium 122 as a plurality of signals indicating recorded event data about the event. System 102 includes an output presentation device 130 for presenting the previously recorded signals thereon to the system user. As the system user views the output presentation, shown by arrow 156, the user uses the system features to store notes about the event being presented. Output presentation device 130 is in communication with storage medium 122 including the plurality of signals 890 indicating recorded event data about the event. Output presentation device 130 is connected for providing a plurality of address data items to the processor of the system as user-requested address values; each address data item is a recording address value indicating a portion of the plurality of signals 890 indicating the recorded event data. Preferably, the plurality of signals 890 indicating the recorded event data includes the plurality of address data items, but output presentation device 130 may itself generate them as the plurality of signals is being presented by output presentation device 130.

One implementation of the present invention has been implemented as a software program on an Apple Macintosh® Model IIfx computer running the System 7 operating system, available from Apple Computer, Inc., of Cupertino, Calif. The software program is written in a standard version of the C++ programming language in conjunction with the Apple MacApp class library, using a compiler available from Apple. This pen-based embodiment utilizes a Wacom Handwrite Digitizer (model HD-648A) and attached stylus for user input, available from Wacom Technology Group, 501 SE Columbia Shores Blvd #300, Vancouver, Wash. 98661. The Wacom digitizer interfaces with the Macintosh IIfx through a serial line protocol developed by Wacom.

This pen-based implementation includes components for simultaneously recording an event in real-time, and for correlating user-entered notes with the recording. This implementation, therefore, also utilizes a Sony Hi-8 video recording machine, model EVO-9800, connected to a Sony video camera, model 9100, both available from Sony Corporation, for making a video recording of an event. The VCR is connected to the Macintosh IIfx through a serial line protocol developed by Sony for providing an SMPTE time value when requested by the system of the present invention. The software interface between the Macintosh and the VCR for requesting and receiving the SMPTE time value was written by the authors and uses a BVU-800 communications interface specified by Sony. It will be apparent to those of skill in the art that a wide variety of programming languages and hardware configurations could readily be used in place of those in the illustrated embodiment based on the description herein without departing from the scope and intended utility of the system of the present invention.

C. Description of the system processing of the present invention.

1. Storing information in address zones.

a. Creating an address zone and entering information therein.

FIG. 1 illustrates the steps in creating and using address zones according to the system of the present invention. For purposes of this general description, suppose that the system user is attending a business meeting (i.e., the "event") and brings to the meeting a processor-controlled system operated by the system of the present invention. The processor-controlled system includes a clock source as an address source for providing time data to the processor, and also includes a stylus device as a user input device. However the user input device could also be a conventional keyboard device, and processing considerations and adjustments accounting for the choice of input device are explained in more detail below. Figures of the images displayed in display area 180 (FIGS. 23 and 24) used in this general description are intended to show user-produced event data entered from either type of device, and are not intended to limit the present invention in any way. In the suggested scenario of the meeting, the meeting begins, and the system user begins operation of the system using the system of the present invention. In box 204, the processor receives a signal from the system user requesting that a spatial region representing an address zone be created in display area 180. In response to this signal, the system, in box 206, accesses the clock source to get the current time. Also in response to this signal, the image shown in FIG. 2 is presented to the user, in box 208. The image in FIG. 2 presents a display feature 14 in the form of a horizontal line that represents an address zone marking location in display area 180 that provides the perception to the system user of establishing spatial region 18 in display area 180. Spatial region 18 will also be called time zone 18. Any other display feature, or set of display features, or a graphical display object may be used to provide the perception of a spatial region. For example, a display object in the shape of a rectangle that is perceived to be similar to what is commonly called an index card may be displayed.

FIG. 2 also includes header area 12. Prior to creating time zone 18, the system user may want to enter general information about the meeting, such as its title, purpose, or date, or the names of the attendees. All information entered by a system user in area 12 before requesting the creation of a time zone is stored in a header data structure stored in the memory of the machine.

FIG. 2 may also include the display of the current time 10 obtained from the clock source. Display of the time is an optional implementation decision. When displayed, it may be of use in helping the system user keep track of the substance of the event, and in providing information about the event based on the times displayed in multiple time zones, or in the interval associated with a time zone.

Further in response to the signal requesting a new time zone, the system creates an address zone data structure, in box 210. The address zone data structure is described in more detail below.

Next, the system then receives, in box 214 signals indicating user-produced event data entered in display area 180 in spatial region 18. These signals include an entry location in display area 180 from which a spatial region location may be computed.

Figure 3:
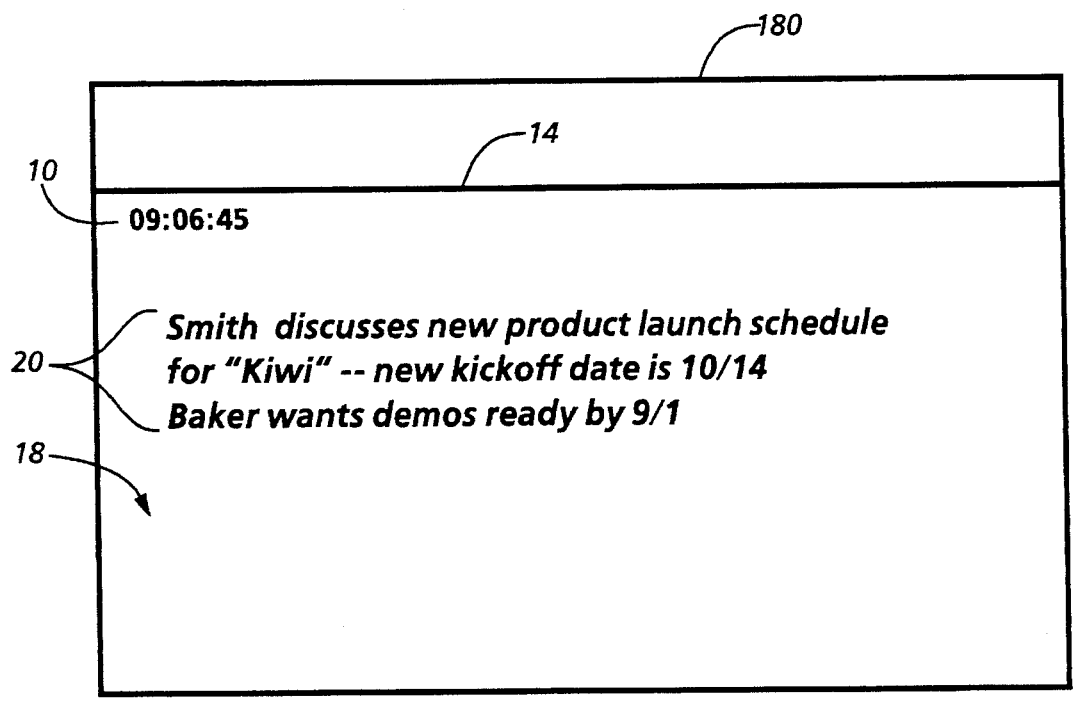
FIG. 3 is a display screen produced in response to a system user entering user-produced event data according to the steps shown in FIG. 1.

In response to these signals, the system displays an image of the entered user-produced event data in spatial region 18, in box 218. FIG. 3 illustrates this image 20. Further in response to the signals indicating user-produced event data, the system stores the user-produced event data in the address zone data structure, in box 220.

Figure 4:
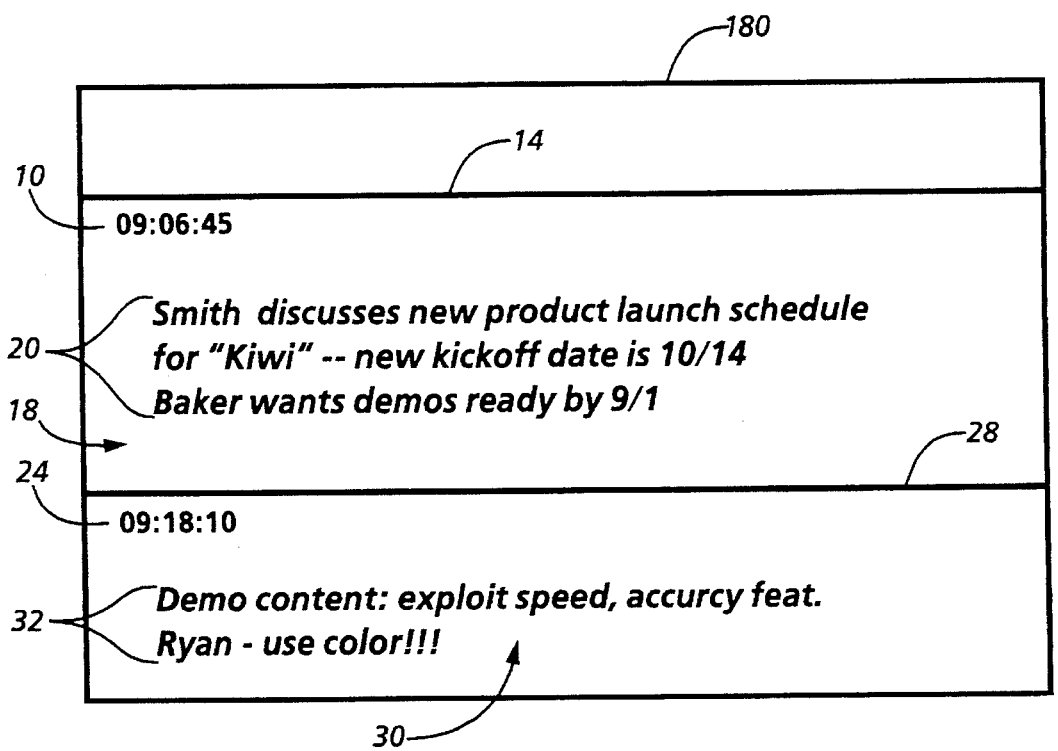
FIG. 4 is a display screen showing a second address zone having user-produced event data produced in response to signals from the system user according to the steps shown in FIG. 1.

All user-produced event data entered in spatial region 18 in display area 180 will be displayed in spatial region 18 and stored in the same portion of the address zone data structure. When the system user wants to establish a new time zone, the signal requesting a new time zone is entered, and the system responds as described above in boxes 206, 208, and 210. Similarly, in response to the system user entering user-produced event data in the new time zone, the system responds as described above in boxes 214, 218, and 220. FIG. 4 shows a second time zone 30 marked by display feature 28 representing a second address zone marking location in display area 180. Time zone 30 is associated with time value 24.

b. The address zone data structure.

The address zone data structure and the information designator data structure produced by the system of the present invention are "model data structures" from which are produced all or a portion of the images with which the system user interacts. A model data structure is a combination of interrelated data items, at least some of which are "model data items". A model data item is contrasted with a data item containing image definition data defining an image, such as a "pixel data item". As will be apparent from the description below, the address zone data structure may contain data items containing image definition data defining an image, but cannot be entirely comprised of data items containing image definition data. A model data structure is not necessarily limited to a combination of data items physically located in a substantially contiguous part of a system's memory, but may include individual model data items diversely located in memory and accessible by the processor when it performs the operation.

In the illustrated embodiment, the address zone data structure and the information designator data structure are collections, or lists, of individual address zone data structures, and information designator data structures, respectively, describing "objects". An "object" typically represents a semantic aspect of an application domain (e.g., letters, words, and paragraphs in a word processor; graphical display features in a drawing program; temporal events and dependencies in a project management system; etc.). Object-based models permit several types of operations to be performed by a system user on the objects in the model that are represented as display features or display objects in images. For example, new objects can be added to the model data structure based on signals, actions, or gestures made by the system user, and these new objects will be presented for display at a designated spatial location when the image is produced; an object can be deleted from the model data structure by deleting its display object representation from the image; and an object can have any one of its properties changed by arbitrary computations. The image produced from such a model data structure may show an object overlapping spatially with another object. For model data structures operated on by an application which presents an editable image, an object can be moved to a new position in space, and the model data structure changed accordingly to have information correctly indicating the new position. Where an application provides for receiving input for performing editing operations, a user may manipulate objects in an image, and the user's input signals, converted to display position information, can be mapped to specific objects in the model data structure in order to allow the user to edit or otherwise manipulate the object-based model data structure.

Typically also, each object, along with its properties, is uniquely addressable by a pointer or identifier, and thus objects can refer to each other in their descriptions. Objects or their properties may also describe relations or constraints between other objects.

In one type of object-based model, the object data item descriptions fully describe how objects are to be spatially presented with respect to each other in an image. Such an object-based model data structure is rendered into either a graphics or procedural model data structure, such as the PostScript® page description language, or directly into an image definition data structure (such as a pixel array) in order to guide the display hardware and software to display the objects on the display. PostScript® is a trademark of Adobe Systems. Other types of object-based models do not include data that fully describe how objects are to be spatially presented with respect to each other in an image, and an application that operates on such object-based models must include instructions for laying out the objects in an image. Typically, the application uses some form of object identification data in the model to determine where an object is to be positioned in the image, effectively linking the object to its position. The system of the present invention may implement the object-based model data structures used in any manner most suitable for achieving processing efficiencies or other system goals.

Figure 10:
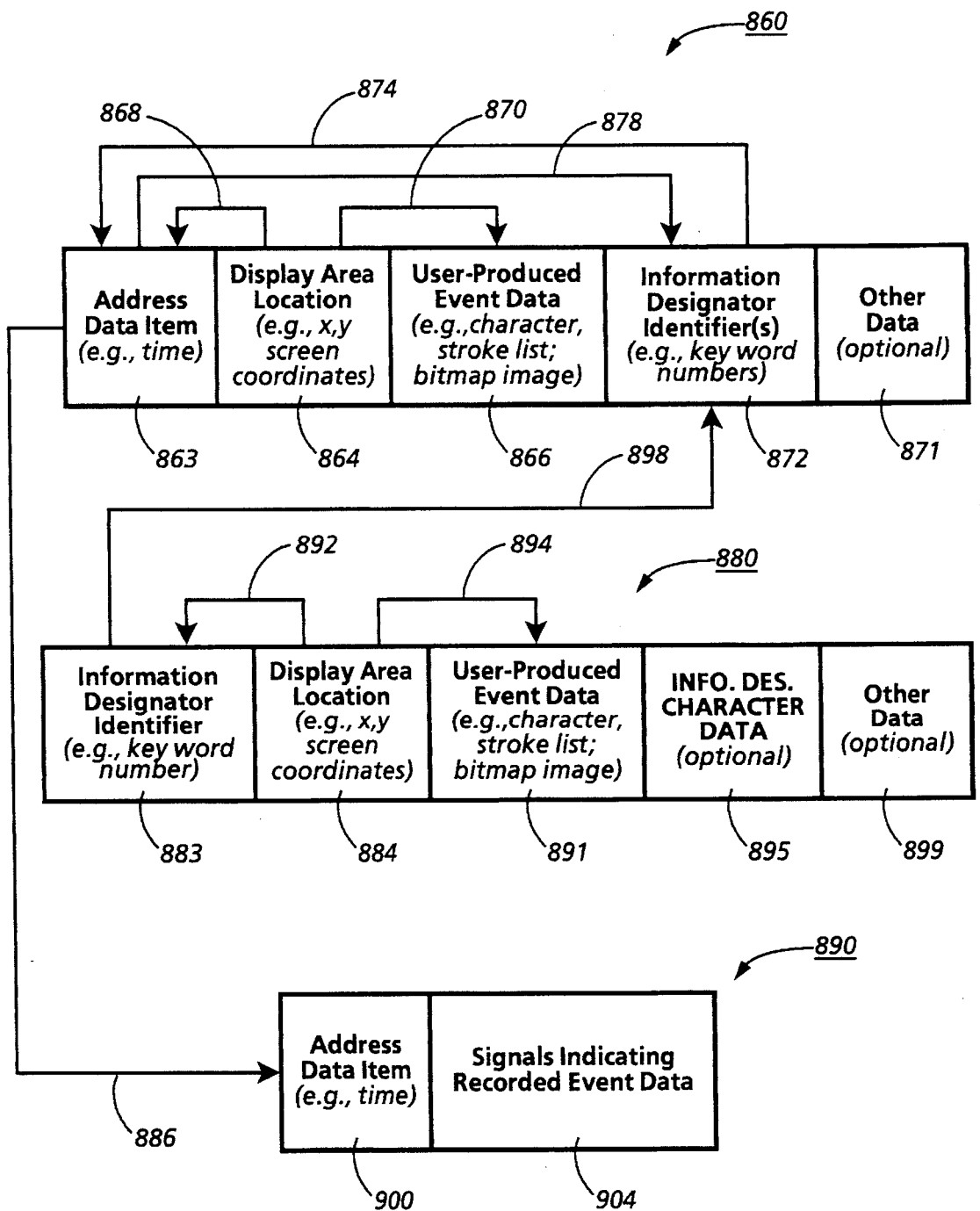
FIG. 10 is a schematic diagram of the organization of the data structures and their interconnections used in the illustrated embodiment of the invention.
Figure 11:
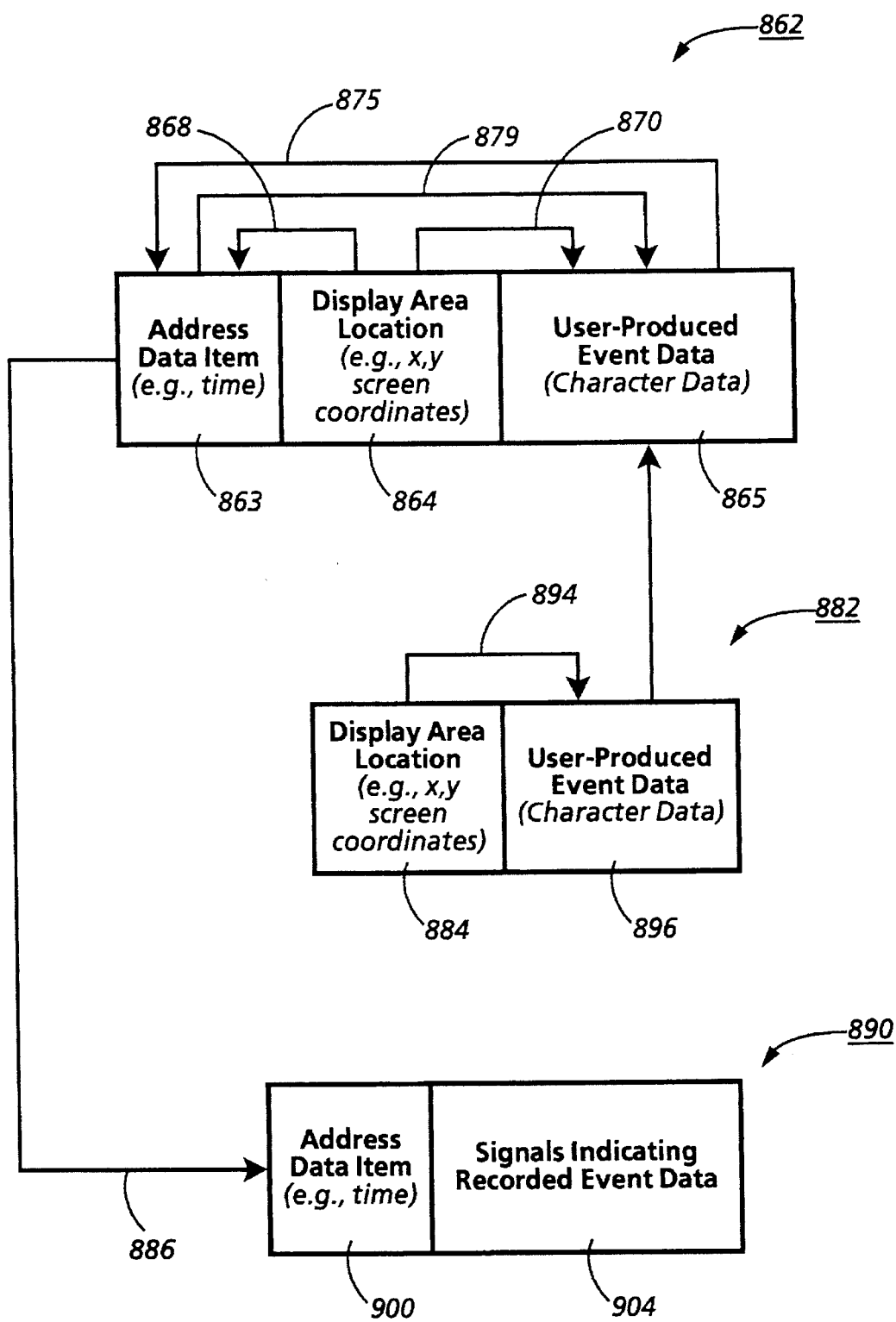
FIG. 11 is a schematic diagram of an alternative organization of the data structures that may be used in another embodiment of the invention.

The system of the present invention, however, need not be implemented with object-based model data structures as shown and described herein, and will operate as described when non-object-based data structures are organized to support the connections between the data items as described below. Connecting lines and arrows in FIGS. 10 and 11 illustrate the concept that a first data item indicates a second data item. As noted earlier, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. The connection between the data items may be implemented using pointers or other linking mechanisms, or by defining the data structures in memory to the system, or in any other manner that accomplishes this connection.

Another variation in the implementation of the system of the present invention that affects the data structure organization is the type of user input device that is used. In the illustrated embodiment, the system user uses a stylus device to enter data in the form of strokes on a tablet-like display. In the illustrated embodiment, these strokes, which are pixel data items, are not operated on for recognition purposes and conversion to model data items. However, as stroke recognition software techniques and efficiency improve, such recognition processing is contemplated as being within the scope of the present invention. The data structures used in the illustrated embodiment of the present invention are organized for accommodating the storage of strokes as user-produced event data. These data structures are shown in FIG. 10. FIG. 11 shows a slightly different organization when the strokes entered are recognized or when a keyboard or other input device is used which directly produces character data as input. The organization of the data structures 862 and 882 in FIG. 11 is readily understandable from the description of the organization of the data structures 860 and 880 in FIG. 10 and they will not be discussed in further detail.

With reference now to FIG. 10, an address zone data structure 860 is created every time the system receives signals requesting the creation of a time zone. In response to those signals, in box 210 of FIG. 1, the time value obtained from the address source is stored in address data item 863, and the address marking location of the beginning of the spatial region 18 is stored in display location area data item 864. The address marking location may either be determined by the system, for example, when the system controls the placement of the spatial regions in display area 180, or it may be determined from the user's request signals, as, for example, from the beginning of the position of the stylus device in the display area when the user makes the request to create a time zone. The address marking location marks the beginning of a spatial region in the display area. Thus, address zone data structure 860 can be said to be "represented by" spatial region 18 in display area 180. In the illustrated embodiment, the ending of a spatial region is determined by the beginning of the next spatial region, and no ending location need be stored in address zone data structure 860, but an ending location may be computed and stored in address zone data structure 860 for efficiency purposes. The address marking location may either be an absolute location in the display area, or established as an offset from a starting display location, as, for example, when a window system is used, and the time zones are displayed in a workspace, or window in the display area. The display location area data item 864 indicates address data item 863, as shown schematically in FIG. 10 by line and arrow 868. In the illustrated embodiment, the address data structures for multiple address regions are stored in memory in their spatial creation order in the display area.

In response to the signals entering user-produced event data, in box 220 of FIG. 1, the following processes are performed in order to store the user-produced event data in address zone data structure 860. The spatial region location of the user-produced event data entered in the display area is used to obtain the address zone data structure 860 corresponding to, or represented by, the spatial region in the display area. The display coordinates of the beginning position of the user-produced event data are used to search all address zone data structures for the proper corresponding data structure using the address marking location as a beginning comparison location. Once obtained, the user-produced event data is stored in data item 866. The user-produced event data may be stored in the form of strokes, or as a bit-map image. The display location area data item 864 indicates data item 866, as shown schematically by line and arrow 870. In the illustrated embodiment, each pixel location in the user-produced event data displayed in a particular spatial region is stored in data item 866, and so every stroke is retrievable from data item 866 by knowing its display area location.

c. Creating an information designator and associating it with an address zone.

Figure 5:
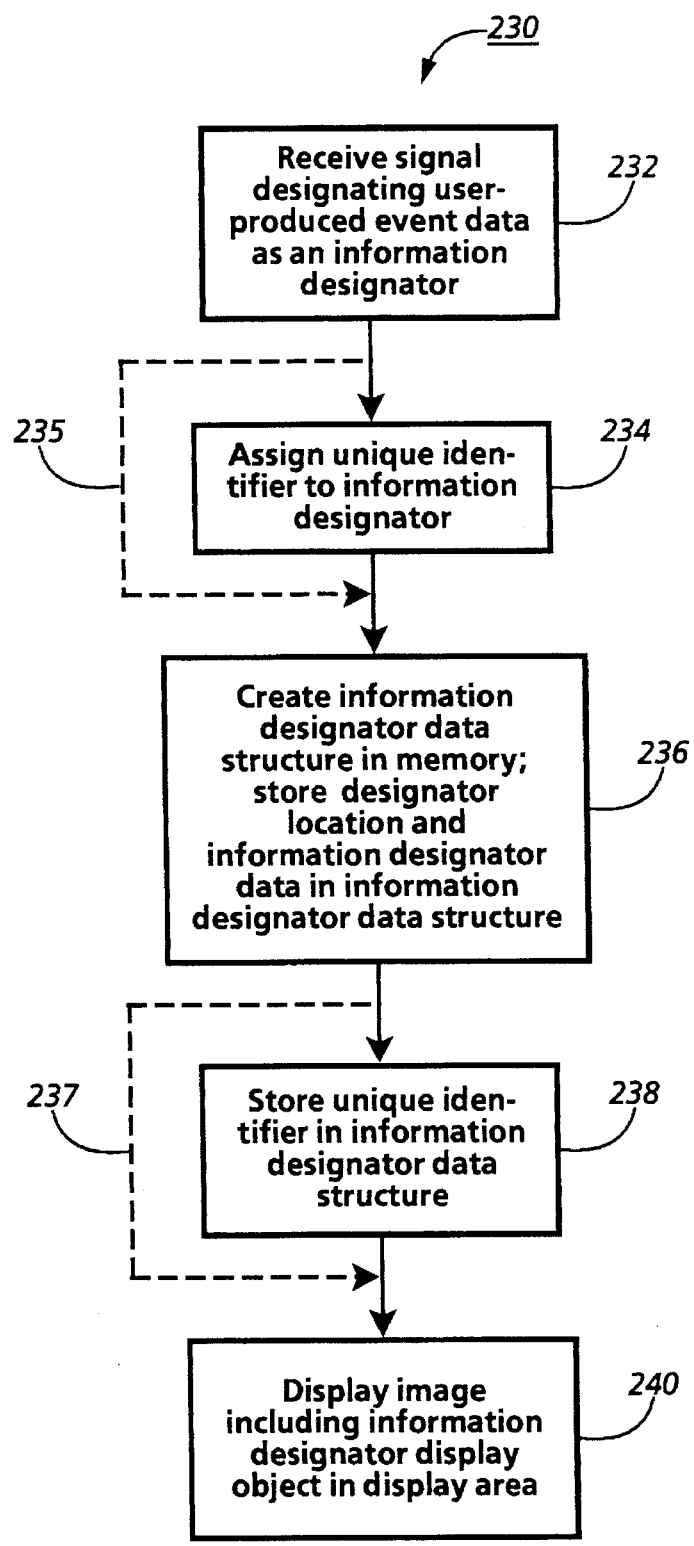
FIG. 5 is a flow chart illustrating the creation of an information designator according to the system of the present invention.

Continuing with the meeting scenario proposed earlier, suppose that the system user realizes that some portion of the substance of the meeting is relating to the subject of "demos". According to the system of the present invention, the system user may designate some previously entered user-produced event data as an information designator for the purpose of tracking that data through the course of the event, or for correlating that data to the address value of a spatial region. In FIG. 5, there is illustrated the creation of an information designator, and, in FIG. 7 there is illustrated how an information designator may be associated with a time zone. In FIG. 5, the processor receives, in box 230, a signal from the system user designating display features in the display area representing user-produced event data as an information designator. The signal includes the display location of the user-produced event data. In response to the signal received in box 230, an information designator data structure is created, in box 234. Processing related to the information designator data structure is described in more detail below.

Figure 6:
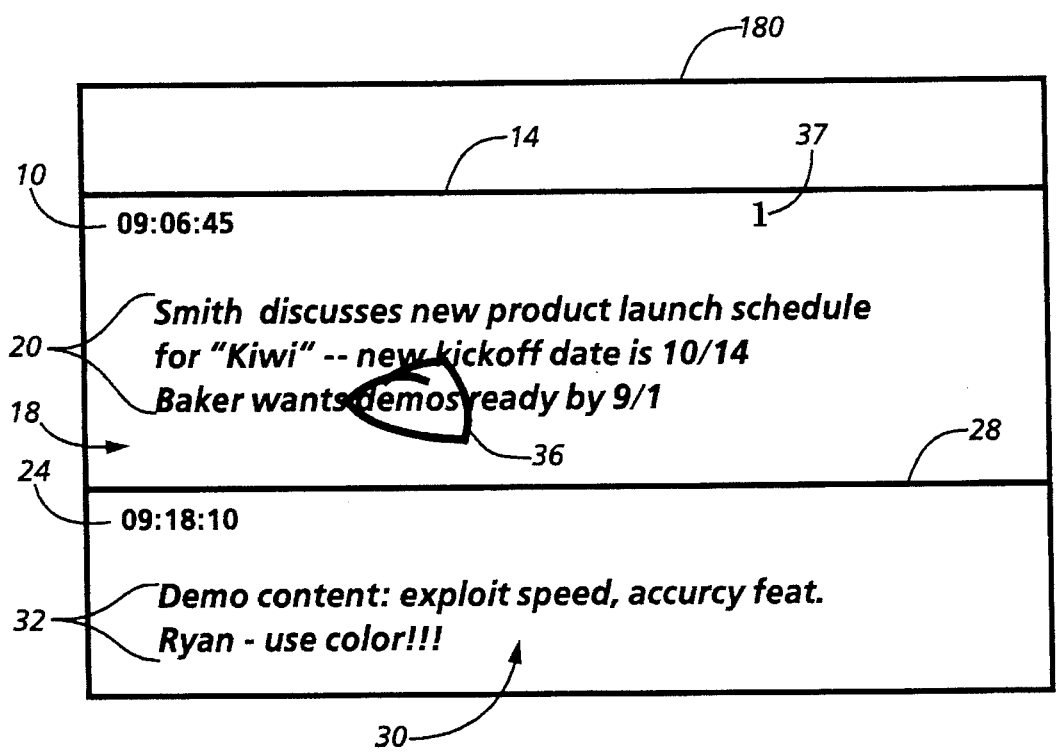
FIG. 6 is a display screen produced in response to the request to create an information designator according to the steps shown in FIG. 5.

Further in response to the signal received in box 230, an image is displayed in the display area that includes a designator display object representing the information designator. FIG. 6 illustrates the display of an image showing a designator display object 36 representing an information designator. When the system user uses a stylus input device, an information designator may be designated using a stroke interpreted as an enclosure gesture. FIG. 6 shows designator display object 36 as the image of the word "demos" enclosed in a stroke, and displayed in spatial region 18. The designator display object 36 representing the information designator may be displayed in a time zone region, or the information designator may be displayed in a distinct region of the display area reserved for information designators, as will be seen below from the description of the user interface for the present invention.

Figure 7:
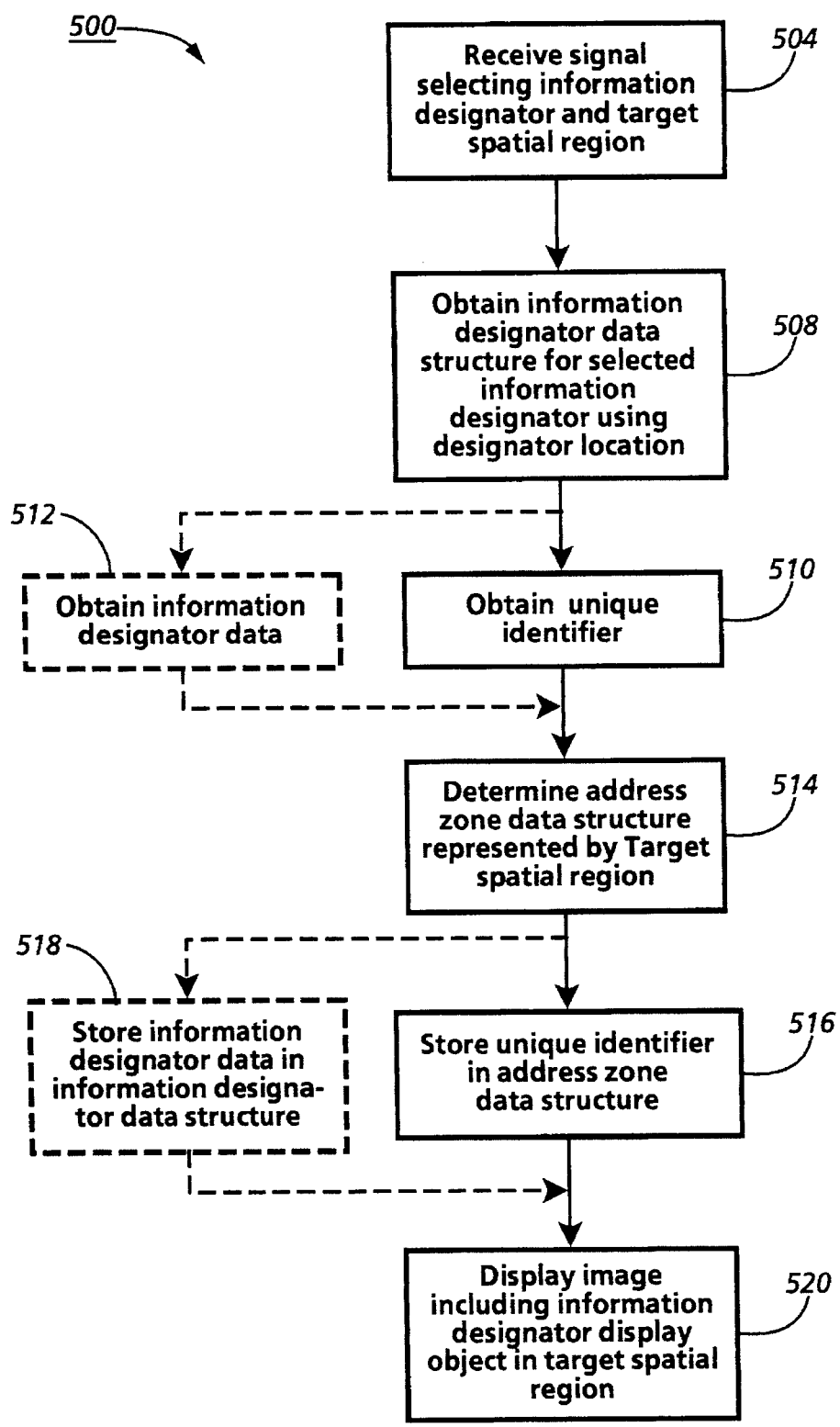
FIG. 7 is a flow chart illustrating associating an information designator with an address zone according to the system of the present invention.
Figure 8:
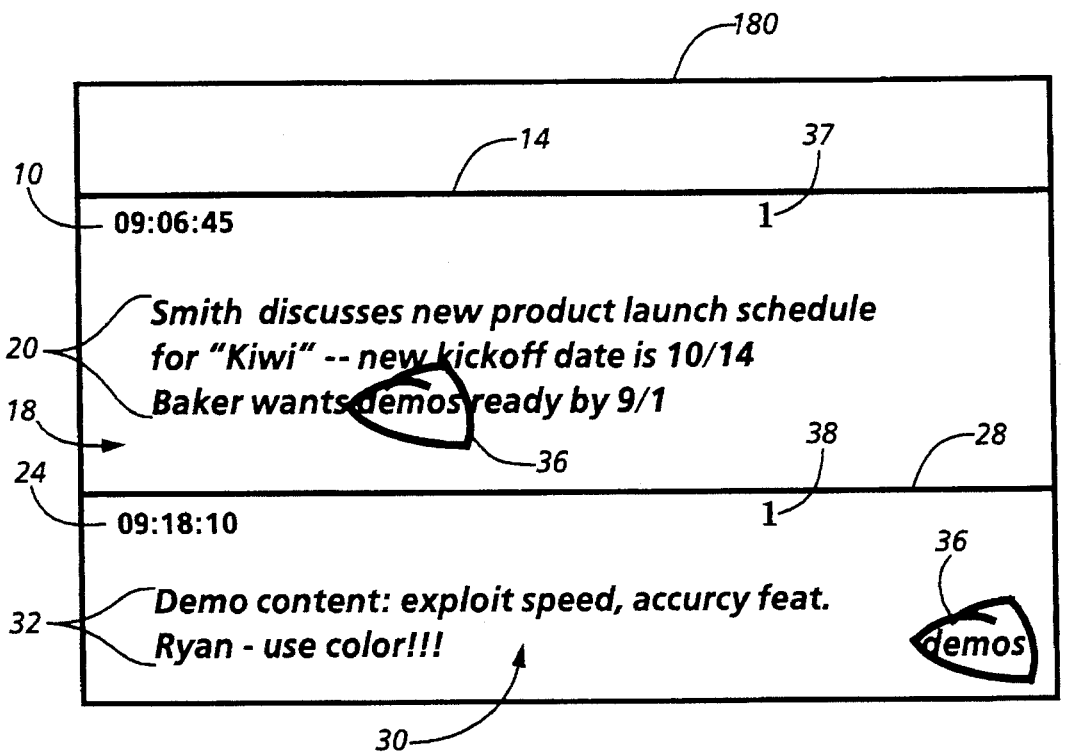
FIG. 8 is a display screen produced in response to a selection request from the system user associating a selected information designator with an address zone according to the steps shown in FIG. 7.

The system user may associate, or "attach", the information designator represented by designator display object 36 to any spatial region in display area 180 by selecting the designator display object 36 representing an information designator and indicating a target spatial region location. In FIG. 7, these selection and target spatial region location signals are received in box 504. Interaction with the data structures is accomplished in boxes 508–518. Then, in box 520, image definition data defining an image showing the results of associating an information designator with a spatial region is produced and displayed. FIG. 8 shows the results of designator display object 36 representing the information designator "demos" associated with time zone 30. In the illustrated embodiment, since the user-produced event data is stored in the form of strokes or an image, the information designator is also an image, and is shown in FIG. 8 displayed in the target spatial region 30. There are several alternative ways, described below, of showing to the system user that an information designator is associated with a particular spatial region.

d. The information designator data structure.

In response to the signal received in box 230 of FIG. 5, an information designator data structure, or object, is created, in box 234, for each user-produced event data designated as an information designator. Information designator data structure 880 is shown in FIG. 10. A unique information designator identifier, hereafter called a "unique identifier", is assigned to the information designator, in box 234. A unique identifier is assigned so that the information designator may be accessed and manipulated computationally without having to recognize the strokes comprising the user-produced event data. In the illustrated embodiment, ordinal numbers are used as unique identifiers. If the user-produced event data is recognizable as character input, it may be used directly as the information designator, and arrow 235 shows that processing in box 234 may be optionally omitted. In box, 236 the user-produced event data designated as the information identifier is stored in data item 891. This user-produced event data is obtained from the address zone data structure using the display area location of the user-produced event data to first identify the proper corresponding address zone data structure, and then to search data item 866 for the selected strokes designated as the information designator.

Also in box 236, a designator location is determined for the information designator and stored in display location area data item 884. The designator location is determined by the system and indicates the location in display area 180 where the designator display object representing the the information designator is displayed. If the information designator is to remain displayed in the spatial region in which it was originally created, the designator location is a location in the spatial region, as shown in the example illustrated in FIG. 6. Alternatively, the information designator may be displayed in a separate information designator region, distinct from the display of the spatial regions, and a designator location for the information designator is selected by the system and stored in display location area data item 884. If a distinct information designator region is used, information designators may also be created in that region. As with the address marking location of a spatial region, the designator location is typically established as an offset from a starting display location in the display region. The designator location stored in display area location data item 883 indicates the unique identifier stored in data item 883, as shown schematically in FIG. 10 by line and arrow 892. Display area location data item 883 also indicates the user-produced event data designated as the information designator stored in data item 891.

Next, the unique identifier is stored in data item 883, in box 238 of FIG. 5, and, again, this step is not performed if the user-produced event data may be used directly as the information designator; arrow 237 shows that processing in box 238 may be optionally omitted.

In the illustrated embodiment, the creation of an information designator leaves the information designator "selected", so that the system user may then signal the selection of an address zone with which it is to be associated. Alternatively, when an information designator is created using user-produced event data previously entered in a time zone, designation of the user-produced event data designated as the information designator also results in associated the information designator with the time zone in which it was created. This would involve the additional process, shown in FIG. 7 as box 516, of storing the unique identifier in the address zone data structure 860, in information designator data item 872. In addition, the unique identifier in information designator data structure 880 would also need to indicate the unique identifier in the address zone data structure 860, as shown schematically in FIG. 10 by line and arrow 898.

When a unique identifier is used to identify an information designator, it may be displayed in the spatial region to which the information designator is attached, as shown in FIG. 6, with the display of unique identifier 37 shown as ordinal number "1", in spatial region 18. The display of the unique identifier 38 may be combined with the display of the designator display object 36, or may replace the display of the designator display object 36.

Returning now to FIG. 7, in response to the signals from the system user selecting an information designator and a target spatial region to which the system user wants to attach the information designator, boxes 508 through 518 illustrate the processes performed in order to accomplish this. The selection signal received from the user is a user action selecting the designator display object 36 (FIG. 8) representing the selected information designator and includes the designator location of the selected information designator in the display area. In the example illustrated in FIG. 8, the target spatial region location is a location in spatial region 30. For purposes of display, the user may provide an actual location in the target spatial region at which the designator display object representing an information designator is to be displayed, or simply indicate a target spatial region, in which case the system of the present invention determines a spatial region location in which to present the designator display object representing the information designator.

In box 508, the designator location of the selected information designator is used to obtain the information designator data structure 880 represented by the selected information designator. Then the unique identifier is obtained from the information designator data structure, in box 510. Again, alternative processing for the case where a unique identifier is not used is presented in the dotted line boxes of 512 and 518.

Next, in box 514, the target spatial region location of the target spatial region is used to obtain the address zone data structure 860 corresponding to, or represented by, the target spatial region in the display area. The display coordinates of the target spatial region location are used to search all address zone data structures for the proper corresponding data structure using the address marking location as a beginning comparison location. Once obtained, the unique identifier is stored in the address zone data structure 860, in information designator data item 872, in box 516. In addition, the unique identifier in information designator data structure 880 indicates the unique identifier in the address zone data structure 860, as shown schematically in FIG. 10 by line and arrow 898.

e. Entering notes "out of order" in time zones.

Figure 9:
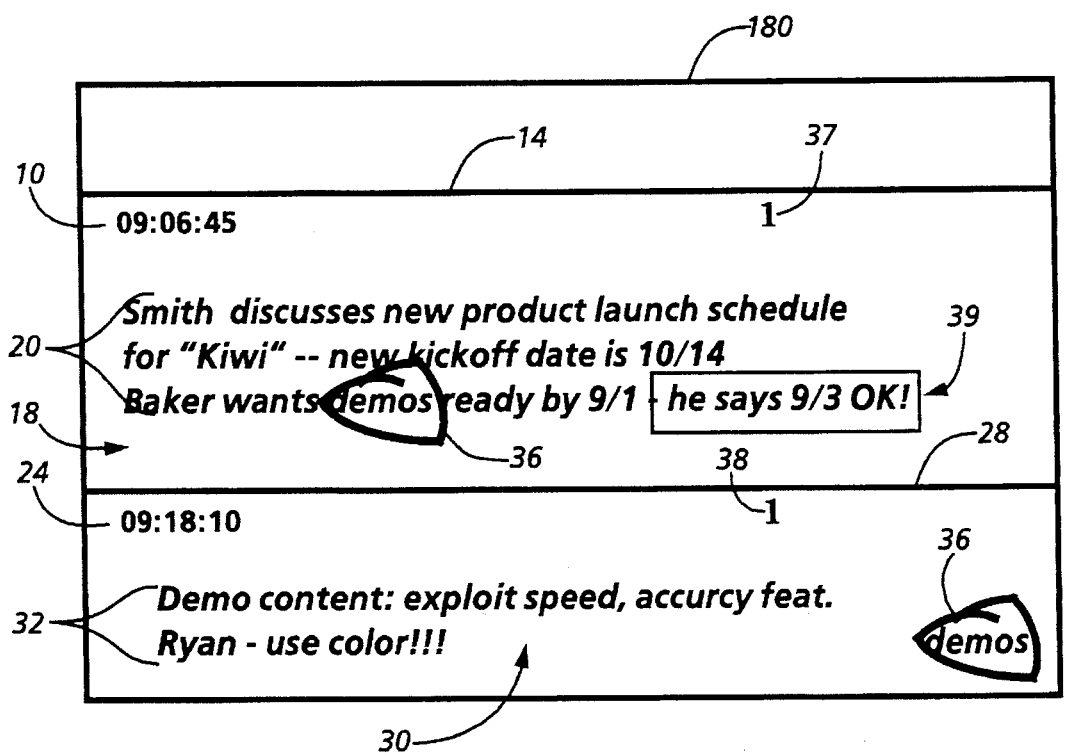
FIG. 9 is a display screen produced in response to a system user entering user-produced event data in an address zone previously created according to the steps shown in FIG. 1.

A significant feature of the concept of user-specified time zones is the ability of the system user to enter notes and information designators in any created time zone, and to have those notes and information designators associated with the address value of the time zone being operated on. In this manner, a user may edit earlier-entered notes by adding to or deleting from user-produced event data, and by adding or deleting associations to information designators, in an earlier-created time zone. In contrast to systems that attach time stamps to individual strokes wherever they are entered and stored in the system, the time value associated with a time zone indicates all user-produced event data and information designators entered within the spatial region defining the time zone. FIG. 9 illustrates a portion 39 of user-produced event data 20 that has been added to time zone 18. Data 39 is represented by a rectangular box outline merely for illustrative purposes in FIG. 9. Since data 39 didn't appear in FIG. 8, and the display screens are presented sequentially in time, data 39 was added at a time after address value 24. However, it will be added to data item 866 in the address zone data structure having address value 10 since the display location of data 39 falls within the display area locations included by display area location 864 for that address zone data structure.

Figure 12:
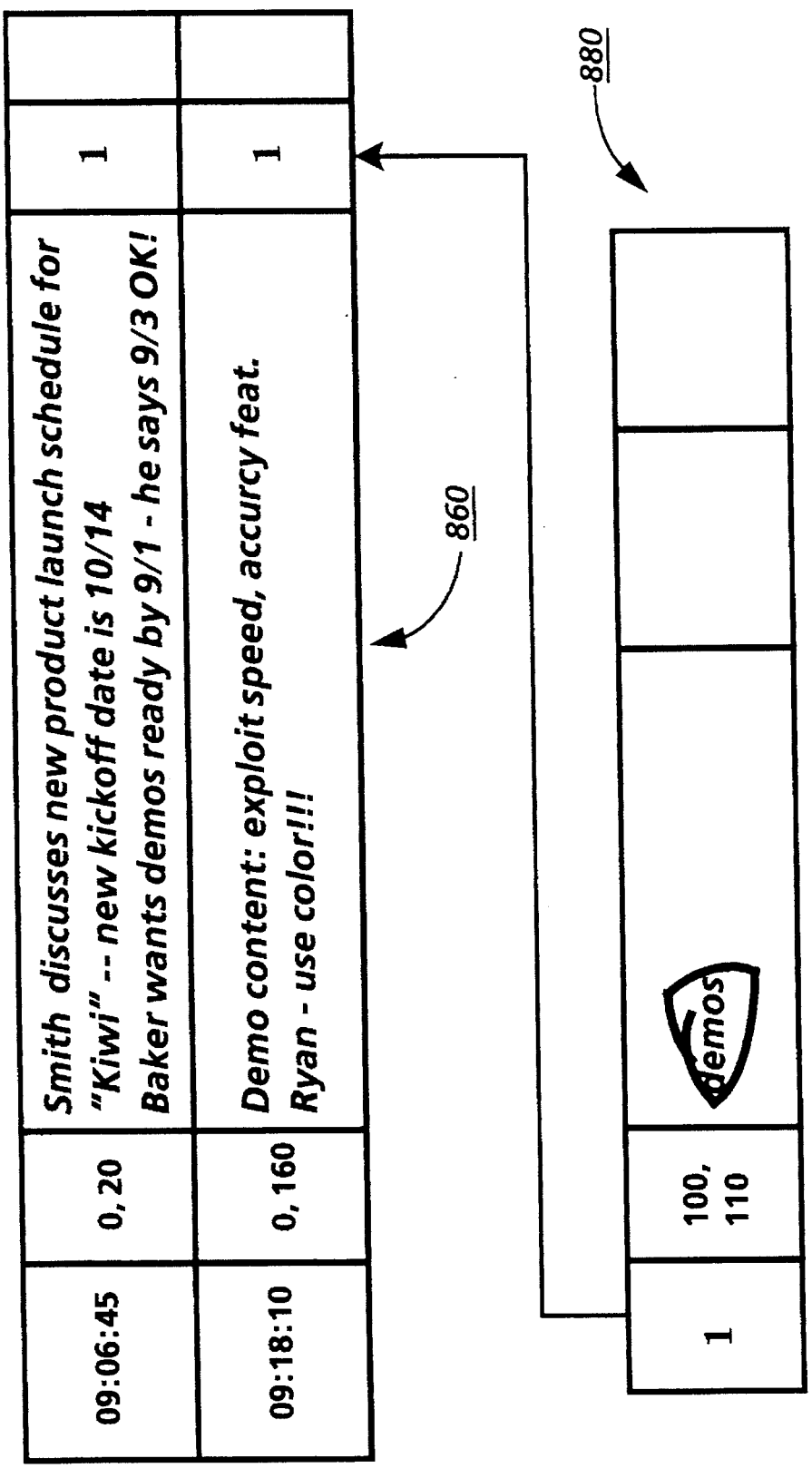
FIG. 12 is a schematic diagram illustrating the data shown in the display screens of FIGS. 3, 8 and 9 stored in the data structures of the illustrated embodiment of the invention shown in FIG. 10, according to the steps shown in FIGS. 1, 5, and 7.

FIG. 12 illustrates the data structures created by the processing described in FIGS. 1, 5 and 7, and shown in FIGS. 2, 3, 4, 6, 8, and 9. The user-produced event data in data items 866 and 891 is shown in image form for clarity, but, as noted earlier, a list of pixels for each stroke may be stored in place of the image data.

f. Recognizing information designators for retrieval purposes.

In the illustrated implementation, a facility is provided for recognition of information designators that are otherwise stored as images or strokes and identified via unique information designator identifiers. At any time during the course of the note-taking, or at the end of a note-taking session, the system user may generate signals indicating a request to enter system-recognizable data for an information designator, and to have that system-recognizable data stored in information designator data structure 880, in character data item 895 of FIG. 10. The user's request includes a selected information designator, selected from the display area and having a designator location. The data may be provided through a conventional keyboard device. When the system user is using a relatively small, pen-based system, such as a personal digital assistant, this may be accomplished after note-taking is completed and the pen-based system is interfaced with a conventional computer system having a keyboard. Alternatively, a character recognition operation may be invoked for the purposes of recognizing the strokes comprising an information designator. The illustrated embodiment uses a pop-up dialog box for requesting the user-entered recognition data, but any conventional user interface method may be used this purpose.

g. Retrieving information from the data structures.

Data access is provided through a variety of data access mechanisms, some of which have been previously described above. The ultimate goal of these mechanisms is to provide the system user with the ability to use the user-produced event data to locate desired portions of the plurality of signals 890 indicating the recorded event data on storage medium 122 (FIGS. 23 and 24.) In the first instance, this is accomplished by directly using the displayed address value in the notes to access the recorded signals. FIGS. 10 and 11 schematically illustrate the plurality of signals 890 indicating the recorded event data on storage medium 122. Some discrete portion of signals 904 are referenced by an address data item 900 for all signals on storage medium 122. Line and arrow 886 shows that address data item 900 stored in recorded signals 890 is obtainable from address data item 863 in address zone data structure 860 (or 862, in the case of FIG. 11.)

Other associations, in addition to the direct access from the address data item to the signals just described, within and between address zone data structures 860 and information designator data structure 880 provide further information retrieval capabilities. Both the address data item 863 and the information designator identifier data item 883 in respective data structures 860 and 880 may be implemented so as to be directly obtainable by value, and not only by display area location. For information designators that have been "converted" to system-recognizable data, as described above, direct data access may also be provided through character data item 895 of FIG. 10. In addition, FIGS. 10 and 11 illustrate other connections that may be made between data items in the address zone data structure 860 that facilitate the retrieval of information from the data structures. Unique information designator identifier data item 872 may be stored in a manner to indicate address data item 863, as shown schematically by line and arrow 874. In addition, address data item 863 may be stored in a manner to indicate unique information designator identifier data item 872, as shown schematically by line and arrow 878. Or, if unique information designator identifiers are not used, as in FIG. 11, user-produced event data item 865 may be stored in a manner to indicate address data item 863, as shown by line 875, and address data item 863 may be stored in a manner to indicate user-produced event data item 865, as shown schematically by line and arrow 879.

These connections between data items and data structures permit access to a wide variety of data associations for retrieval purposes. Some of these accesses and associations are listed in Table 2 below, in which the numerical references following the data item names are those used in FIG. 10, and the abbreviation "ID" is used in place of "information designator". Items 3, 5 and 6 refer to accessing information designator character data items having system-recognizable data, as provided by the feature of the system described in part f above.

TABLE 2

Data Access and Retrieval

| Data Access via | Retrieval Examples |
| --- | --- |
| 1. Address Data Item (863) | List all unique ID identifiers (872) for each address value |
| 2. Address Data Item (863) | Display ID data items (890) (e.g., strokes) for each address value |
| 3. Address Data Item (863) | List all ID text (895) for each address value |
| 4. ID identifier (863) | List all address values (863) for each unique ID identifier |
| 5. ID text (895) | List all address values (863) for each ID text item |
| 6. ID text (895) | List all unique ID identifiers (872) for each ID text item |

2. The user interface of the present invention.

The user interface of the system of the present invention provides a very flexible, easy to use display environment for facilitating a system user's natural note-taking style, and for adapting to a variety of note-taking situations.

a. The screen display layout and features supporting the creation of time zones and entering notes.

When the system is first initiated, display screen 600 of FIG. 13 is presented on the display. Display screen 600 includes three workspaces which are implemented in the illustrated embodiment as windows. Transport control workspace 680 is used to operate an output device suitable for presenting a recorded signal to the user, such as a video or audio signal, and will be discussed in more detail in Part C, below. Address zone workspace 610 is the workspace where the system user creates address zones, or spatial regions, for the entry of user-produced data. Address zone workspace 610 shows, for illustrative purposes, four empty spatial regions that have been previously created. The beginning of spatial region 618 is marked by horizontal line 616, and shows address value 614. Another interesting feature of the present invention is that address zones may be purposely created and left empty as address placeholders for portions of an event for which the user has no information to enter. Each of the spatial regions includes a separate region called a "striping" region, as illustrated in spatial region 622 showing striping region 626. The striping region is a portion of the spatial region used for associating information designators with address zones, as will be explained in conjunction with FIG. 14. The striping region is shown at the left of workspace 610, but it need not be positioned there.

As a window implementation, address zone workspace 610 includes many of the conventional features associated with a window implementation. Scroll bar 632 at the rightmost side of address zone workspace 610 may be used for scrolling through created address zones using up and down arrows 634 and 636. In the illustrated implementation, display screen 600 does not provide for resizing any of the workspaces for efficiency and performance reasons. However, in other implementations, response time may not be affected by resizing, and the three workspaces presented in display screen 600 could have display features and functions for resizing and moving the windows in display screen 600. As has already been noted, while address zones are created in a linear and sequential order, typically by time, user-produced event data may be entered into any created address zone, in any sequence. In addition, user-produced event data already entered into a created address zone may be edited after entry using a set of limited functions. So a user may need to scroll an off-screen address zone into view in address zone workspace 610 in order to be able to access and edit the user-produced event data stored in the address zone. Area 640 may be reserved for a document or log name indicating the subject matter of the notes.

As noted earlier, the address zone data structures represented by the spatial regions in workspace 610 are implemented as objects in the object-based implementation of the illustrated embodiment. As such, they may be manipulated by manipulating the images that represent them in address zone workspace 610. For example, the displayed size of an address zone may be made larger by making a downward vertical line gesture that begins in the rectangular box 630 at the right of every address data structure. Horizontal line 642 will be moved downward in workspace 610 by the approximate length of the vertical line entered by the user. Movement of the lower boundary of an address zone will result in display area location data item 864 in each affected address zone data structure being updated with new beginning location display coordinates. Address zones may also be deleted in display screen 600 by making a horizontal back and forth gesture (i.e., a horizontal "scratch") over an address value 614. This will result in the address zone data structure represented by the address zone, in this case address zone 618, to be deleted from memory. In workspace 610, the image display features representing address zone 618 including any notes appearing in address zone 618, and horizontal line 616, will be removed from the display. Address zones may also be deleted in display screen 600 by making a horizontal scratch over horizontal line 616.

b. Features supporting creating and using information designators.

Information designator workspace 650 is the workspace where the system user may create and store, in region 654, information designators for purposes of display. As with workspace 610, information designator workspace 650 includes many of the conventional features associated with a window implementation. Scroll bar 658 at the rightmost side of information designator workspace 650 may be used for scrolling through the contents of region 654 for purposes of reviewing or searching for an information designator that may be off-screen. Area 662 may be reserved for a document or log name indicating the subject matter of the notes. Information designator workspace 650 has a workspace 650 data structure (not shown) associated with it for storing data related to the workspace. For example, since the system user may create an information designator in workspace 650, provision is needed for storing the user-produced event data entered in workspace 650 until the gesture for creating an information designator is received. For example, a system user may be interrupted during the creation of an information designator, and not complete the actions until some time later. The workspace 650 data structure stores these strokes and their locations until they are referenced again.

Figure 14:
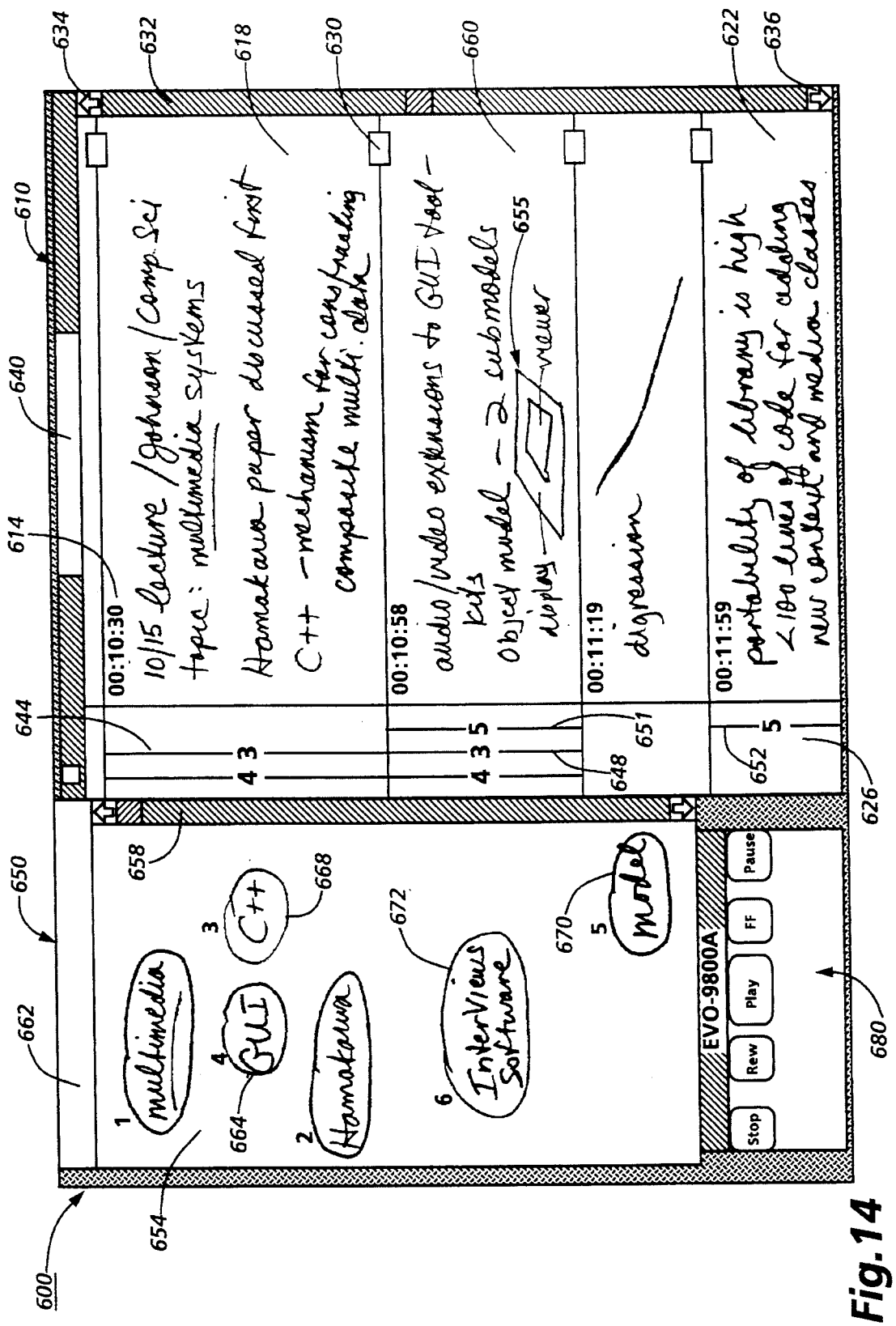
FIG. 14 is a display screen illustrating display objects representing inputs from a system user using the system of the present invention by interacting through the user interface shown in FIG. 13 provided therewith.

FIG. 14 illustrates display screen 600 as it would look when a system user was taking notes about a college computer science lecture while an audio, or video and audio, recording was concurrently being made of the lecture. The system configuration illustrated by this scenario is shown in FIG. 24, and is discussed in more detail below. The address values of the address zones, e.g., the times, are correlated with time signals on an audio or video tape made during the recording of the lecture. FIG. 14 shows user-produced event data entered in each of the spatial regions in workspace 610. It can be seen that this user-produced event data includes picture-like or graphical information 655, which is stored as strokes in address zone data structure for the corresponding address zone.

Of particular interest in FIG. 14 is the use of information designators. Six information designators are shown displayed in information designator workspace 650. Each is displayed with its unique identifier (e.g., the ordinal numbers positioned at the upper left of each designator display object) and includes the user-produced event data designated as the information designator and the enclosure gesture used to create the information designator. The information designator workspace 650 in the illustrated embodiment is colloquially called the "keyword palette". It can be seen that information designator 672 was probably created in workspace 650, since it does not appear in any of the displayed address zones, although it could appear in an existing off-screen address zone. The system user has associated information designators 668, 664, and 670 with various address zone regions by using striping region 626. For example, following the process steps in FIG. 7, the user first selects information designator 668 having unique identifier "3" assigned to it and then makes a vertical gesture in the striping region included in address zone 618. As a result, vertical line 644, interrupted by the unique identifier "3", is displayed in the striping region, representing to the user that the information designator 668 has been associated with the address zone data structure represented by address zone 618.

Another feature of the user interface of the present invention can be seen in the displays in the striping regions. In order to facilitate usage patterns in and visual organization of the information designator, the present invention organizes unique identifiers that have been associated with several successive address zones into columns in the striping region. Thus, information designator 668 has also been associated with the address zone data structure represented by address zone 660. Similarly, information designator 670 has been associated with both the address zone data structure represented by address zone 622, and with the address zone data structure represented by address zone 660. It can be seen that vertical line 652 in striping region 626 could have been positioned anywhere in that region, but it has been visually aligned with vertical line 651 which represents the same information designator. The organization and use of the striping region so that it has columns requires that the address zone data structure include another data item tracking the column position of the unique identifier "stripes" in the striping region, so that such visual alignments may be created and maintained.

The information designator data structures represented by the designator display objects in workspace 650 are also implemented as objects in the object-based implementation of the illustrated embodiment, and they too may be manipulated by manipulating the designator display objects that represent them in information designator workspace 650. For example, an information designator may be moved from one location to another in workspace 650. This will result in the display area location data item 884 in information designator data structure 880 to be updated with the new screen coordinates of the designator display object representing the moved information designator. In addition, information designators may also be deleted from workspace 650 by making the horizontal scratch gesture over a designator display object representing the information designator selected for deleting from workspace 650. This will result in the information designator data structure represented by the address zone to be deleted from memory, and will also result in the unique identifier assigned to the information designator selected for deletion to be removed from any address zone data structure in which it has been stored (i.e., removed from information designator identifier data item 872), and to be removed from display in the striping region.

For processing efficiency, the last selected or last created information designator remains as a selected information designator during subsequent processing until a new information designator is selected or created, so that the system user may omit the selection gesture when assigning an information designator the user knows is currently selected.

c. Features supporting the operation of the output presentation (e.g., playback) device.

The user interface of the present invention also provides a system user with a simple mechanism for gesturing with the electronic stylus to control the output presentation device 120 or 130 of FIGS. 23 and 24 (e.g., a video or audio cassette player.) The mechanism minimizes the amount of hand, head and eye movement expended by a user because the stylus is both the note-taking device and the output device control mechanism. Incorporating recorded medium access control also enables the user to maintain focus on the media itself rather than on the control mechanism of the output presentation device, thereby providing "eyes-free" control.

Figure 14A:
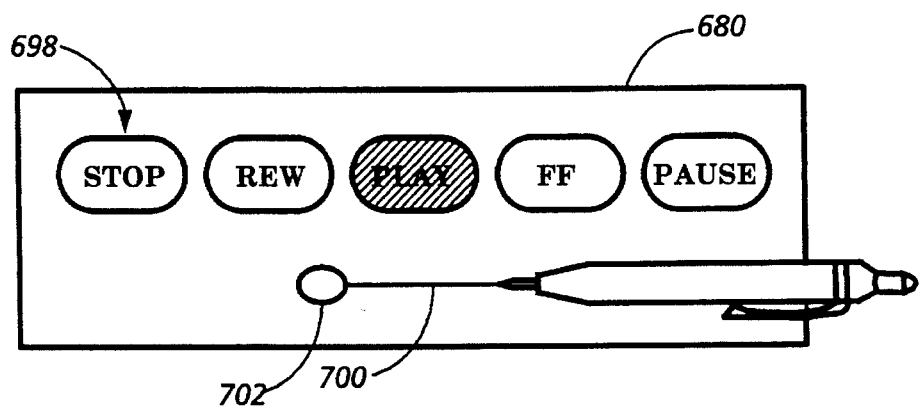
FIG. 14A is a enlarged view of the transport control workspace of the user interface shown in FIGS. 13 and 14 for controlling the operation of the output device that presents the plurality of signals indicating the recorded event data.

FIG. 14A shows a close-up view of workspace 680 of screen 600 in FIGS. 13 and 14. FIG. 14A provides an interface to a standard video cassette recorder (VCR) and playback device, but workspace 680 may of course be configured for control of a different output presentation device. A system user gestures with the stylus, by tapping for example, on any of the images of buttons 698 which mimic the standard buttons found on VCR control panels to control the videotape. An alternative method of control is also provided. The system user may draw a horizontal line 700 with the stylus in the space below the buttons. A small oval 702 is drawn by the system to highlight the starting point of the line. The drawn line is interpreted by the system as follows: the direction of the horizontal line (left or right) indicates the playback direction (reverse of forward), and the length of the horizontal line indicates the playback speed (the longer the line, the faster the playback). For example, a very short line drawn to the left instructs the playback device to play in the reverse mode at low speed.

The drawing of and interpretation of horizontal line 700 is dynamic. Horizontal line 700 is drawn like a rubber band anchored at oval 702. The length and direction of horizontal line 700 are continuously interpreted and the playback mechanism continuously adjusted, which supports the function of shuttling back and forth while looking for a precise location on the recorded medium. The user can pause the playback device by tapping the pen in the workspace 680 without drawing a line (i.e., a zero-length line).

Other, more complex output presentation device controls may be incorporated into the functions associated with transport control workspace 680. For example, the use of the buttons can be used to calibrate the effects of the line drawing technique for the user. Thus, when any button is tapped, a line having equivalent effect could be drawn by the system. This way the user would be able to see how long a line causes a normal speed play. Or, there can be a nonlinear interpretation of line length for speed in order to give better control. For example, pause (zero speed) and normal speed are special speeds, and it should not require precise handling of the stylus to achieve these. Thus, very short lines are interpreted as pause and line length "close to" the normal speed length are interpreted as normal play speed, giving the effect of a "detent" in a knob control.

Finally, requiring the user to draw horizontal line 700 within the confines of workspace 680 violates a truly exact "eyes-free" goal. It might be preferable in some situations to allow users to draw the horizontal control line on any part of the electronic tablet. In this case, the user would somehow have to instruct the computer that the gesture is meant to be interpreted as a playback control gesture and not as a notation. One way to do this is to hold down a button on the electronic stylus to denote the drawing of an output presentation device control gesture. Such an implementation would free the user of having to locate workspace 680, thus further reducing the amount of attention needed to control the output presentation device.

d. Input stroke processing.

The pen-based illustrated embodiment of the present invention is a "modeless" pen-based system accepting strokes that are determined to be either "gestures", i.e., commands or request signals, or "ink", i.e., user-produced event data. Modeless operation means that the system user does not have to signal the system before making a gesture, or before entering strokes intended as user-produced event data. A brief description of the input stroke processing is now provided.

In the illustrated embodiment of the Macintosh implementation, the stylus, or pen, input device is considered to be the equivalent of a mouse input. Pen down is equivalent to a mouse click, and drawing is equivalent to a mouse drag. A pen (or mouse) inputs a series of positions, or "pixels," that it touches. Thus, a mouse or other graphically based input system could be used to provide input as well.

The pen input is continuously tracked from pen down (touching the screen) to pen up (leaving the screen), forming a list of continuous pixels. The pen input is sampled—the pixel position is detected at certain times, and the pixels in between each sample are filled in. The smoothness of the response to the pen is directly proportionally to the the sampling rate of the stroke motion. Each pen down to pen up is considered a stroke, and so a single letter or a single word may be made up of a number of strokes, depending on the writing style of the user. Because the system is modeless, the system looks at each stroke as it is made to consider whether or not it is a "gesture."

FIGS. 15A through 15G show a list of the valid gestures detected by the system of the present invention in the present embodiment. The presently recognized gestures are dot (small point), horizontal scratch (a series of at least four horizontal lines in alternating direction), vertical scratch (a series of at least four vertical lines in alternating direction), horizontal line, vertical line, circle, and mini circle. Clearly, other gestures may also be used, but the gestures here have been found to be useful in that they are easy to create, and are relatively different from regular handwriting. Since the gestures are entered by the user of a graphical input system, such as a pen or mouse, the gestures are unlikely to be perfectly drawn. For example, the circle, as shown, must be generally circular, but need not necessarily be an exact circle. In the present embodiment, empirical limits have been determined as described below to recognize intended gestures that may not be exactly horizontal or vertical with acceptable accuracy.

Figure 16:
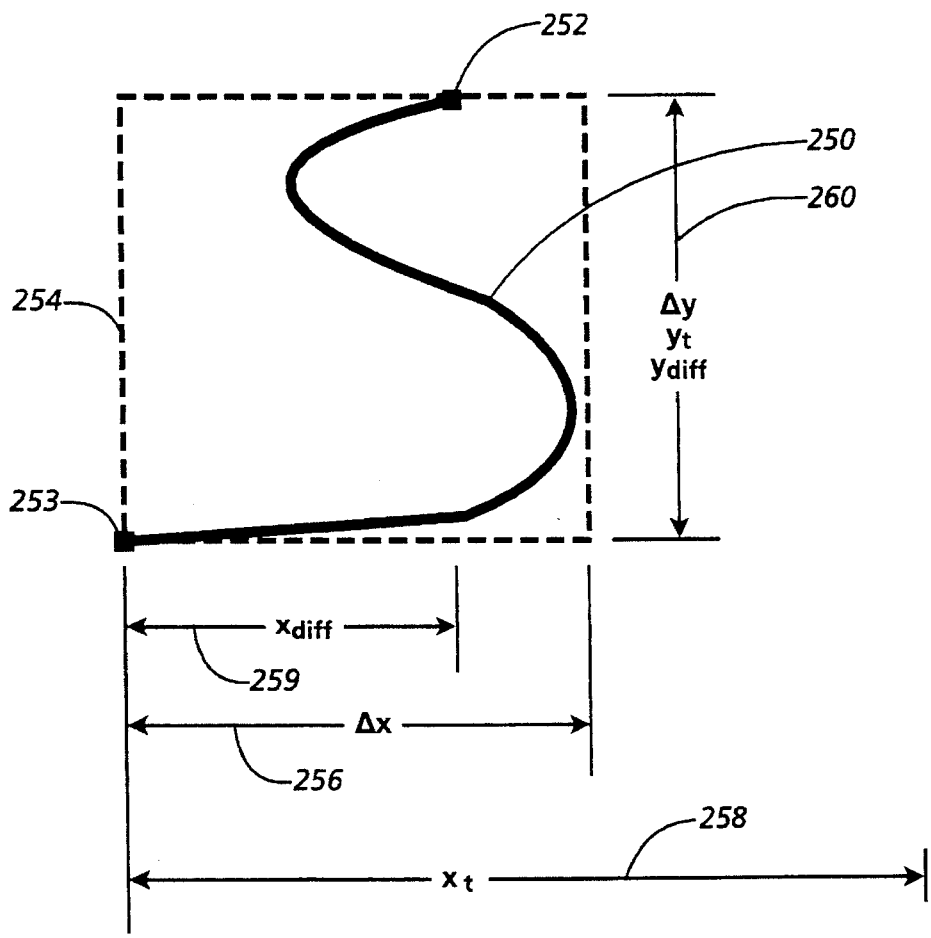
FIG. 16 illustrates measurements used by the illustrated embodiment of the present invention to determine if a stroke is a gesture.

All strokes may be tested in a similar manner. A stroke 250 is shown in FIG. 16. Stroke 250 begins at point 252. A boundary box 254 is considered around the stroke, and directional transitions are noted. Three values in each dimension are noted—in the x direction, the overall width in x position $\Delta x$ 256 is calculated, the total traversed distance $x_t$ 258 is calculated, and the absolute value difference in $x_t$ position from the starting point 252 to the end point 253 $x_{diff}$ 259, is calculated. The $\Delta y$ 260, traversed $y_t$, and difference $y_{diff}$, are also calculated. For stroke 250, $\Delta y$, $y_t$, and $y_{diff}$ all happen to be the same.

Figure 17:
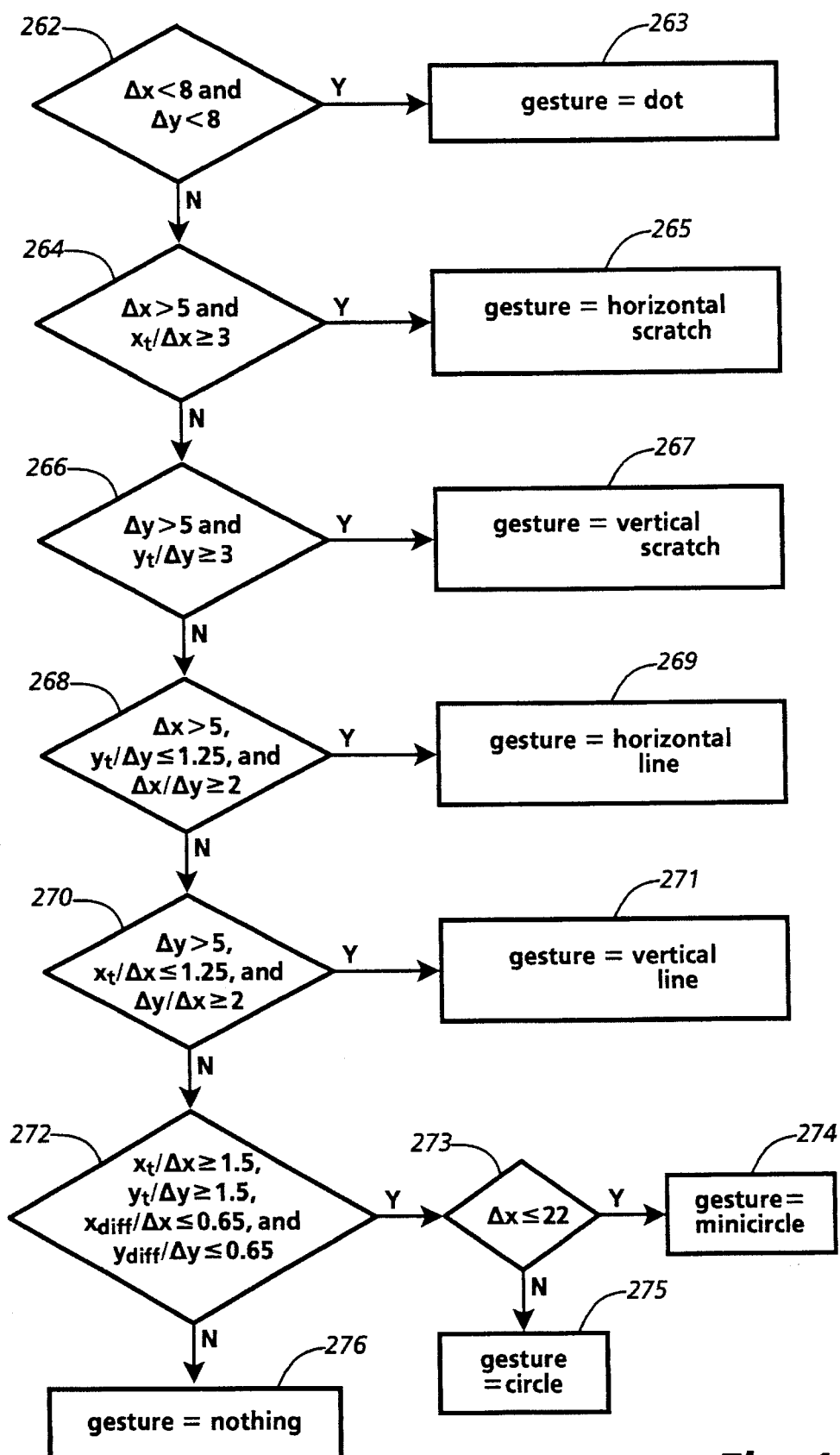
FIG. 17 is a flowchart illustrating the steps for detecting a gesture according to the illustrated embodiment of the present invention.

FIG. 17 describes the general method for detecting a gesture, given the information shown in FIG. 15. The step in box 262 checks to make sure the x and y widths are each less that eight pixels. So any very small dash will set the gesture value to a dot in the step in box 263. In the step in box 264, the total x distance traversed $x_t$ must be at least three times the x width $\Delta x$. When this is true and the width is at least 5 pixels, the gesture value is set to "horizontal scratch." The step in box 266 performs essentially the same test over the y distance, to detect a "vertical scratch." The step in box 268 detects a horizontal line by testing that the bounding box is much longer in the x direction that it is in the y direction. Likewise, the step in box 270 tests that a bounding box is much longer in the y direction than in the x direction.

The step in box 272 tests to see that the stroke has at least come almost back on itself in both the x and y directions, and that the starting and ending points are relatively close together. If that is true, then the step in box 273 also checks to see if the x width $\Delta x$ is less than 22 pixels. If it is, then the gesture value is set to a mini circle. Otherwise, the gesture is set to a circle.

If none of the above conditions is found, as would be the case with stroke 250, then the step in box 279 sets gesture to "nothing," or no gesture. The pixel values as shown in FIG. 17 have been empirically determined for the present embodiment. Other relative values may be used to achieve similar results since it is simply the proportional comparison which is important. Other methods may also be used to detect gestures besides the method here presented. For example, strokes could be divided into directional segments, and the properties of the segments used to determine the gesture. It has been found, however, that the method herein discussed works well in the present embodiment.

Some strokes are considered gestures when they appear in particular areas of the display screen, but are not gestures in other areas. For example, the Transport Control area only recognizes a horizontal stroke as a gesture. A horizontal scratch is considered a delete gesture in any display area except the Transport Control Display area. Table 3 provides a summary of the definitions of various gestures that are discussed in more detail in FIGS. 18–22. Note that both horizontal and vertical lines have different meanings in different areas of the display. All references to "information designator" have been abbreviated as ID.

TABLE 3

Gesture Definitions.

| STROKE | INPUT AREA | ACTION |
| --- | --- | --- |
| Dot | ID workspace | Select ID |
| Horizontal Scratch; (horizontal back and forth) | any workspace except Transport control | Delete/Erase stroke |
| Horizontal Line | Address zone workspace | Create address zone |
| Horizontal Line | Transport control workspace | Control Output Device Presenting Recorded Signals |
| Vertical Line | address zone control box in address zone workspace | Manipulate address zone boundary |
| Beginning of stroke inside an ID region; end of stroke outside an ID region | ID workspace | Manipulate position of the selected ID in ID workspace |
| Vertical Line | Striping region | Attach ID identifier |
| Enclosure gesture; | ID and address zone | Create ID |

TABLE 3-continued

Gesture Definitions.

| STROKE | INPUT AREA | ACTION |
|---|---|---|
| e.g. Circle | workspaces | |
| Mini enclosure gesture; e.g., mini circle | ID workspace; Striping region (any size enclosure gesture) | Select ID identifier |

In the present implementation, it is generally preferable to have a gesture checking routine which checks and returns values for each valid gesture in the system, as shown in FIG. 17. In areas in which the returned gesture is not valid, the operation may simply ignore the inappropriate gesture and deal with the stroke in the appropriate way. In the discussion of individual gesture recognition hereinafter, only those gestures that are valid in a particular area will be considered.

Figure 18:
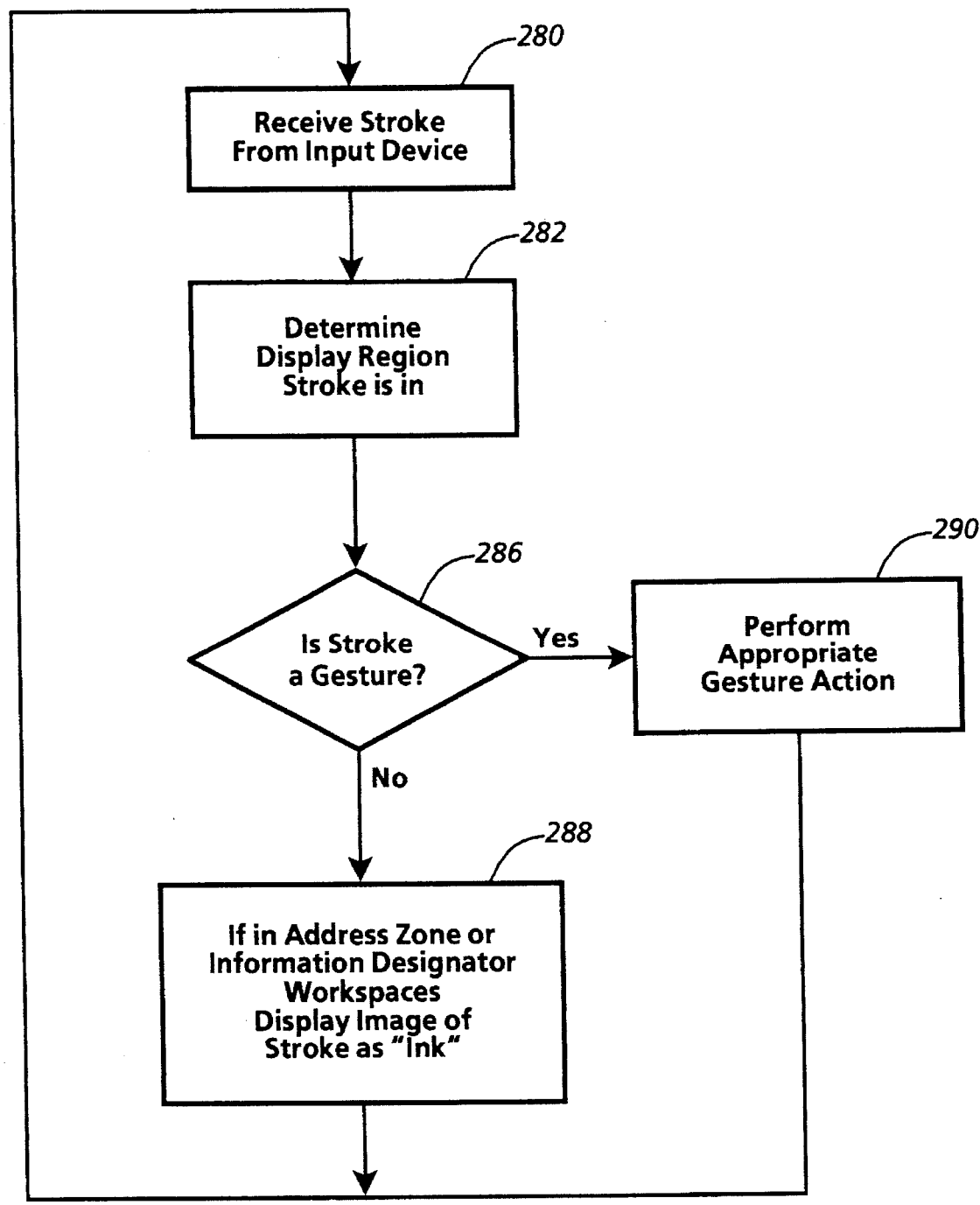
FIG. 18 is a flowchart illustrating the general operation of the present invention in response to a stroke from the input device.

FIG. 18 describes the general operation of the system in response to a stroke from an input device. The step in box 280 receives the stroke. The step in box 282 determines the display region that the stroke has been made in. The stroke is considered "in" the area which it starts in. So, for example, if the stroke were to cross a time zone boundary, the stroke would be attached to the address zone in which the pen initially went down.

The step in box 286 determines if the stroke is a gesture. When a valid gesture is input, the step in box 290 performs the appropriate action based on that gesture. If the stroke is not a gesture, the input stroke is displayed as an image, or "ink," in the address zone or information designator display areas in the step in box 288.

FIGS. 19–22 discuss in more detail the identification of valid gestures shown in step 286 of FIG. 18. Steps 292–296 determine which input display area the stroke originated. The step in box 292 determines if the stroke has been made in the address zone Display Area. If it has, the step in box 300 determines whether the stroke is an appropriate gesture in the address zone display area, as will be described in relation to FIG. 20. The step in box 294 determines if the stroke has been made in the information designator display area. If it has, the step in box 302 determines whether the stroke is an appropriate gesture in the information designator Display area, as will be described in relation to FIG. 21. The step in box 296 determines if the stroke has been made in the information designator striping area. If it has, the step in box 304 determines whether the stroke is an appropriate gesture in the information designator Striping area, as will be described in relation to FIG. 22.

Figure 20:
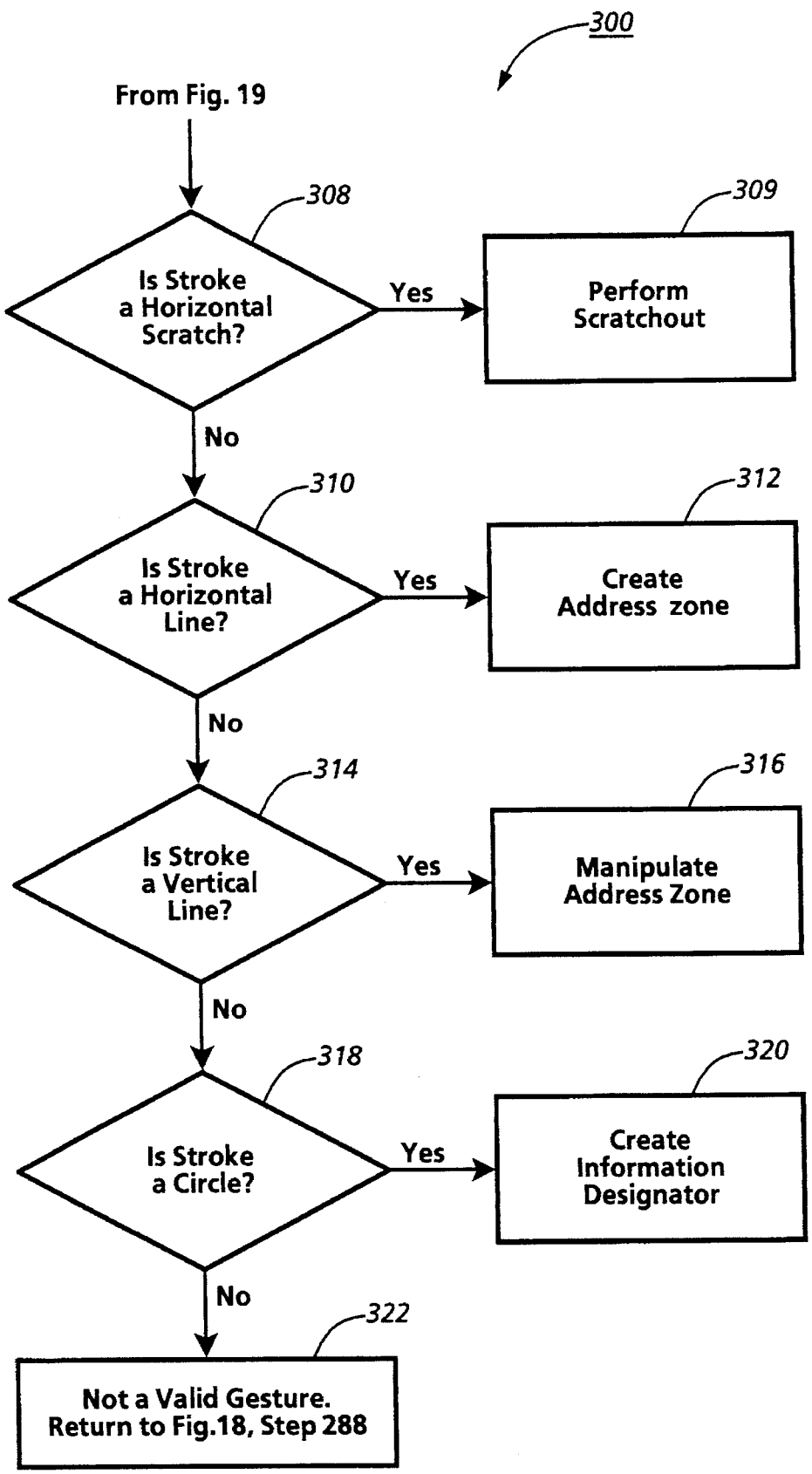

FIG. 20 describes the method of determining a gesture in the address zone Display Area. The step in box 308 determines whether the stroke is a horizontal scratch. If so, the step in box 309 performs a scratch out, or delete procedure. The step in box 310 determines whether the stroke is a horizontal line. If the line is horizontal, then in the step in box 312 it is considered a gesture which indicates that an address zone should be created.

The step in box 314 determines if the stroke is a vertical line. If so, then in the step in box 316 it is considered a gesture which indicates that an address zone should be manipulated—made larger or smaller. The step in box 318 determines if the stroke is a circle. If the stroke is a circle, then in the step in box 320 it is considered a gesture which indicates that an information designator should be created. Generally, the information designator created will also be made the "selected", or "active", information designator, and any previously active information designator will be deactivated. If none of the above gestures—a horizontal scratch, a horizontal line, a vertical line, or a circle—is recognized, then in the step in box 322 the stroke is determined not to be a gesture, and the system returns to step 288 of FIG. 18 to turn the stroke into ink on the display screen.

Figure 19:
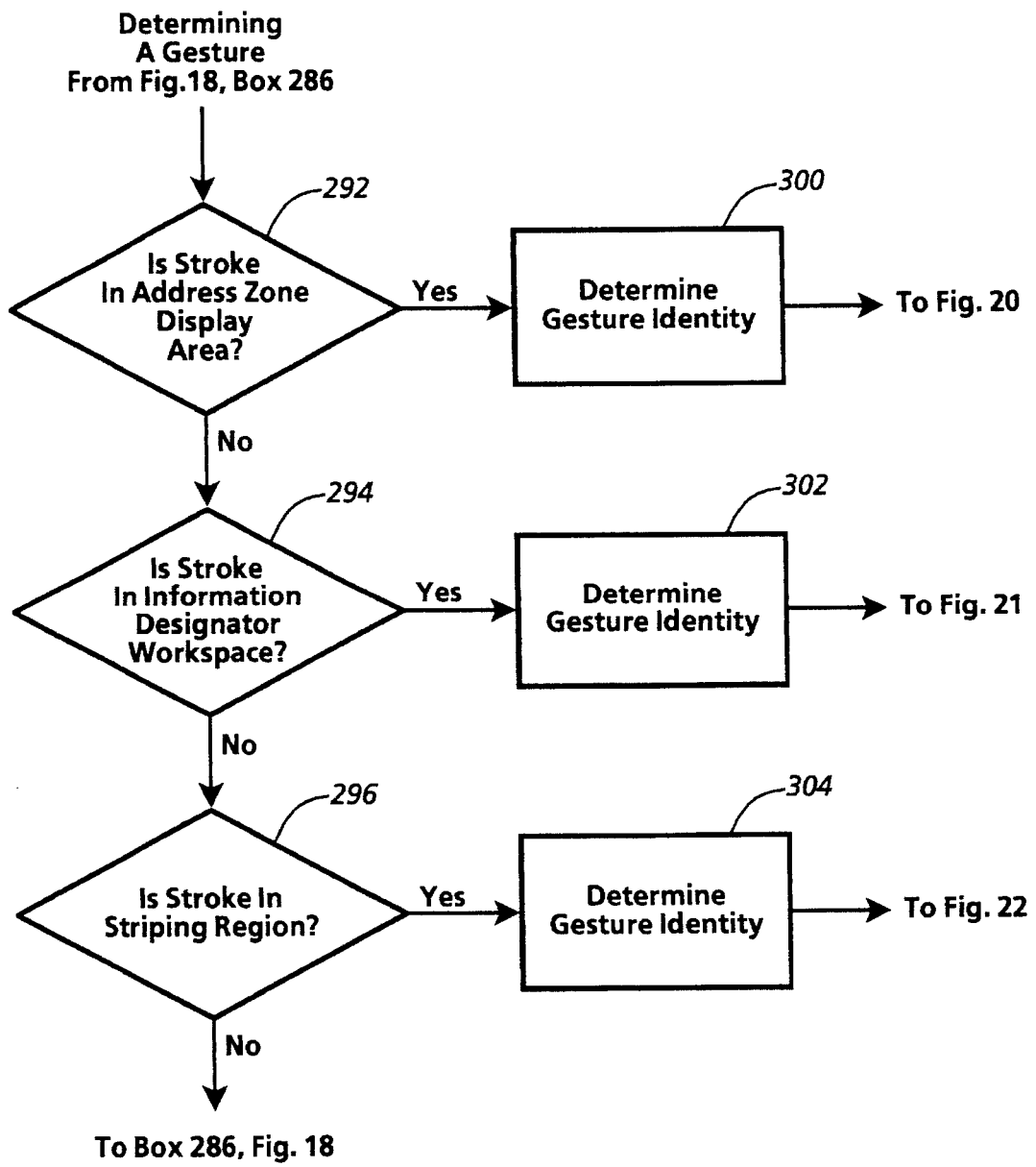
FIGS. 19–22 are flowcharts illustrating the general steps in determining if a stroke is a gesture in an appropriate input area of the user interface of FIGS. 13 and 14.
Figure 21:
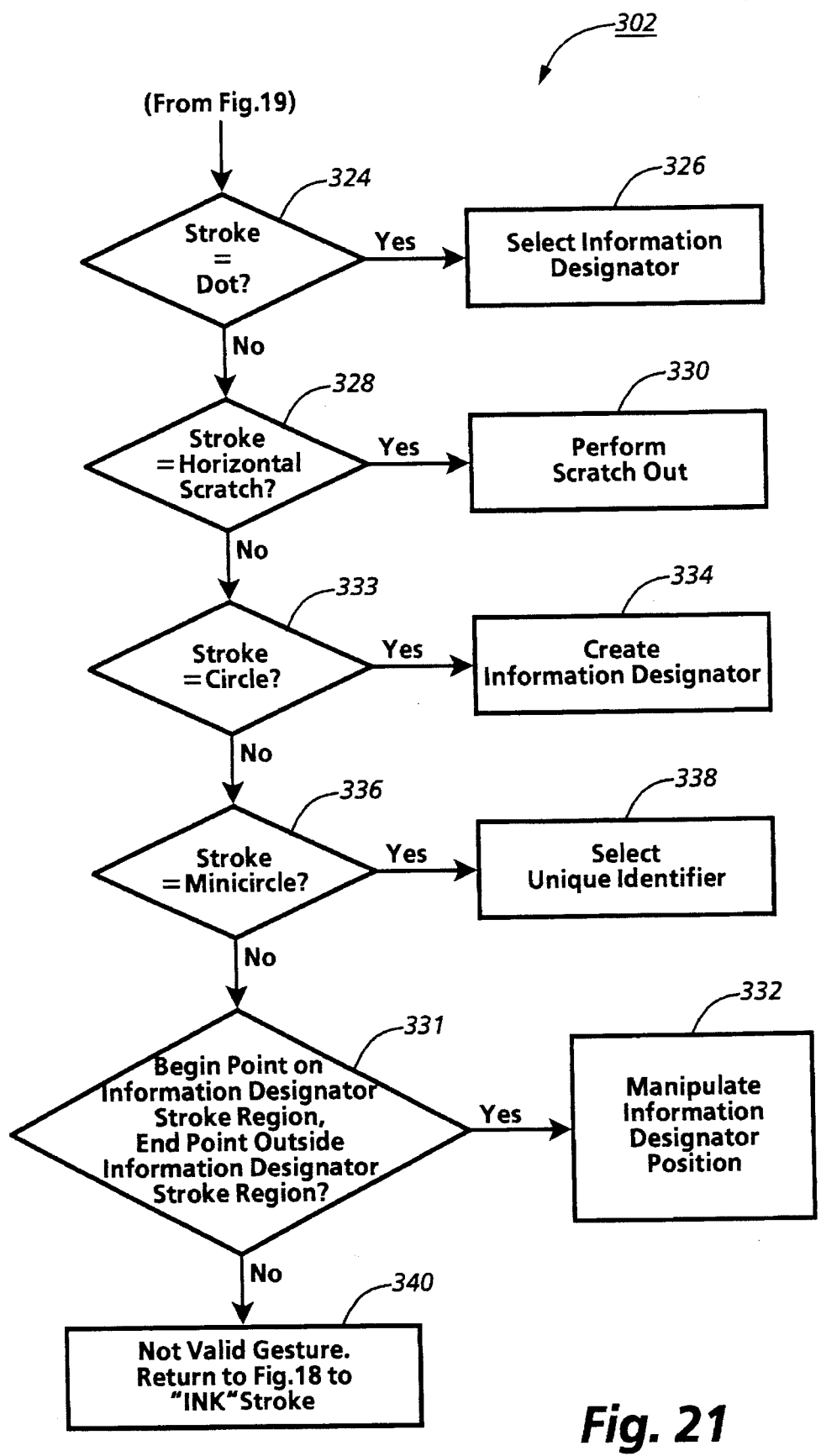

FIG. 21 performs similar steps to determine if a gesture has been made in the information designator display area, as discussed in step 302 of FIG. 19. If the stroke is a dot in the step in box 324, the step in box 326 selects an information designator. The step in box 328 determines whether the stroke is a horizontal scratch. If so, the step in box 330 performs a scratch out, or delete procedure. If the stroke is a mini-circle in the step in box 336, the step in box 338 selects an information designator identifier image. If the stroke is a circle in the step in box 333, the step in box 334 creates an information designator. The step in box 331 checks to see if the beginning point of the stroke is within the boundary region of an information designator, and the end point of the stroke is outside the boundary region of an information designator. If it is, the step in box 332 manipulates the position of the information designator in the information designator workspace by moving it to the designator location corresponding to the end point of the stroke. If the stroke is not a valid gesture in the information designator display area, the step in box 340 returns to step 288 of FIG. 18 to turn the stroke into ink on the display screen.

Figure 22:
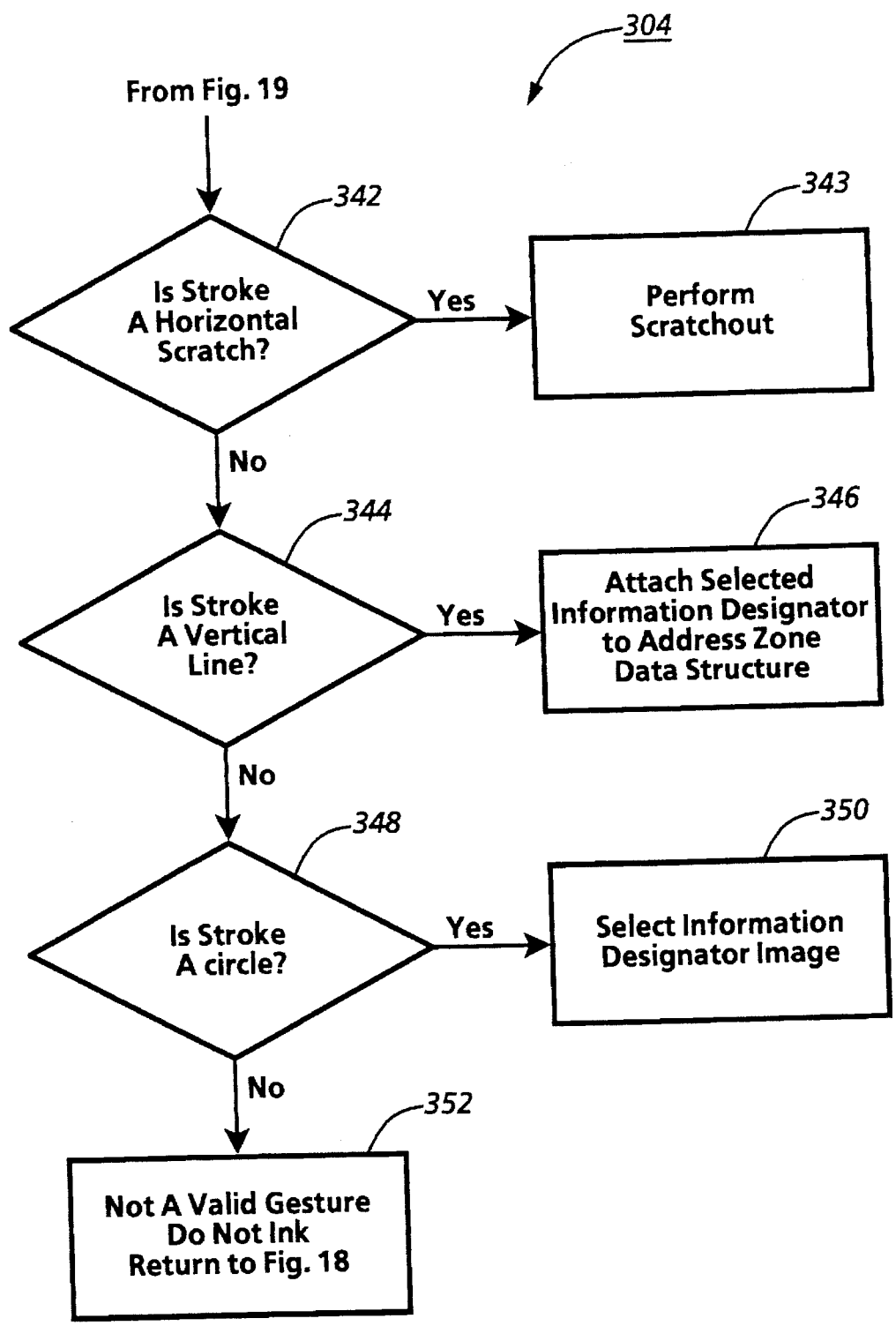

Similarly, FIG. 22 determines if a gesture has been made in the striping region, as discussed in step 304 of FIG. 19. If the stroke is a horizontal scratch, the step in box 343 performs a scratch out. If the stroke is a vertical line in the step in box 344, the step in box 346 attaches the Identifier of the current active information designator to the striping area attached to a address zone.

In box 348, the stroke is tested to see if it is an enclosure gesture (e.g., a circle) of any size. If it is, the step in box 350 selects the unique information designator identifier image, presumably in anticipation of receiving a subsequent gesture from the system user such as associating the information designator with another address zone. In the striping region, only gestures identified by horizontal scratches, vertical lines, or circles are allowed. No writing is allowed, so if the stroke is not one of these gestures, the stroke is not inked and the step in box 352 returns to step 280 of FIG. 18. Once the gesture command has been identified, the system will deal with it in a manner appropriate to the command.

The process of creating an information designator includes finding the data segment or segments contained by the gesture. As described above, in the current embodiment the create information designator gesture is an enclosure gesture, such as a circle. In this embodiment, a process is performed that finds strokes that occur within the area of that circle. In the address zone area, a stroke is considered "within" the circle if at least seventy percent of the stroke is within the area of the circle. In the information designator area, where it is more likely that a stroke is intended to be part of an information designator, at least fifty percent of the stroke must be within the circle. This identification of strokes is accomplished by knowing the area covered by the circle, and is accomplished in the Macintosh environment of the illustrated embodiment using a utility routine that determines whether a pixel is inside or outside of a known region. Then each stroke in the current address zone, and adjoining address zones, is searched for strokes made up of pixel positions which fall within that area.

In summary, the system of the present invention provides a very flexible note-taking user interface that complements diverse personal note-taking styles and application needs, and provides a "pen and paper" metaphor for entering notes. In addition, versatile data structures are provided for organizing the notes entered by the system user to facilitate data access and retrieval to both concurrently or previously recorded signals.

The uses of the present invention described herein are limited only by the uses of the recording of events. For example, in a collaborative environment, several system users, each using the present invention to create and store notes, may each correlate their notes to a single recording in any location, and to the notes of each of the others in the group, by using different clock sources as long as there is a correlating factor relating all of the clock sources to the clock source entering time values on the recorded signal medium. This could be of use, for example, in a collaborative work environment, or in the college lecture scenario posed in the discussion related to FIG. 14.

It is therefore evident that there has been provided in accordance with the present invention, a system that fully satisfies the aims and advantages hereinbefore set forth. While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A processor-controlled system for correlating event data being recorded in real time to event information entered into the system by a system user; the system including a user input device for producing signals indicating actions of a system user;

a display having a display area for presenting images;

a processor connected for receiving the signals from the user input device, and connected for providing images to the display;

a recording device in communication with a storage medium for producing a plurality of signals indicating recorded event data about an event; the recording device currently producing the plurality of signals indicating the recorded event data and storing the signals on the storage medium;

an address source connected for simultaneously providing address data items to the processor of the system and to the recording device;

memory for storing data; the data stored in the memory including instruction data indicating instructions the processor executes;

the processor being further connected for accessing the data stored in the memory;

the processor, in executing the instructions, responding to a first signal from the user input device indicating a request from the system user to obtain a user-requested address value from the address source by accessing the address source and obtaining an address data item indicating the user-requested address value; the address source simultaneously providing the user-requested address value to the recording device for storing with the recorded event data;

presenting a first image in the display area; the first image including an address zone display feature positioned at an address marking location in the display area so that the address zone display feature is perceived by the system user as marking a spatial region in the display area; the first image further including display features representing the user-requested address value positioned in the spatial region so that the user-requested address value is perceived as being associated with the spatial region; and producing an address zone data structure for storing in the memory of the system and storing the address data item and the address marking location therein; the address zone data structure being represented by the spatial region in the display area and being accessible by the processor using either the address marking location indicating the spatial region or the address data item indicating the user-requested address value;

the recording device, in response to receiving a recording address value from the address source, storing a plurality of signals indicating a first portion of recorded event data on the storage medium such that the recording address value provided by the address source indicates the first portion of the recorded event data stored on the storage medium; and the processor, further in executing the instructions, responding to a second signal from the user input device indicating user-produced event data entered by the system user in a spatial region by presenting a second image in the spatial region; the second image including display features representing the user-produced event data entered by the system user; and storing the user-produced event data in the address zone data structure represented by the spatial region such that all of the user-produced event data entered by the system user within the spatial region marked in the display area is accessible by the processor in the address zone data structure using the user-requested address value indicated by the address data item obtained when the spatial region was first produced; the user-requested event data indicated by the user-requested address value being correlated with the portion of the recorded event data indicated by the recording address value simultaneously provided to the recording device by the address source.

2. The system of claim 1 further including an output device suitable for presentation of the plurality of signals indicating the recorded event data stored on the storage medium; the output device being connected for receiving operational signals from the processor for operating the output device to present the recorded event data to the system user; and wherein the processor, further in executing the instructions, when recording of the event has terminated, responds to a third signal from the user input device indicating a selected search address value and a retrieval request by the system user to obtain the recorded event data stored on the storage medium indicated by the search address value; the selected search address value being selected by the system user from user-requested address values associated with user-produced event data entered in spatial regions in the display area; the retrieval request causing the processor to respond by operating the output device to obtain from the storage medium and present the plurality of signals indicating the recorded event data indicated by a recording address value nearest in value to the selected search address value; the recorded event data being correlated with the user-produced event data entered into the spatial region associated with the selected search address value.

3. The method of claim 1 wherein the address source is a clock source simultaneously providing time data items to the processor of the system indicating the user-requested address value and to the recording device recording the event indicating the recording time value.

4. The system of claim 1 wherein the first signal received from the user is received from a stroke inputting device connected for interacting with the display to produce a first stroke as the signal indicating the request of the system user.

5. The system of claim 1 wherein the second signal received from the user is received from a stroke inputting device connected for interacting with the display to produce a stroke as signal; the user-produced event data being a stroke entered on the surface of the display by the system user using the stroke inputting device.

6. The system of claim 5 wherein the processor, when storing the user-produced event data in the address zone data structure, stores signals indicating the stroke entered on the surface of the display by the system user using the stroke inputting device.

7. The system of claim 1 wherein the user input device for providing the signals indicating the actions of the system user is a stylus device connected for interacting with the display to produce the signals in the form of a handwritten stroke.

8. The system of claim 1 wherein the processor, further in executing the instructions, responding to a third signal from the user input device indicating a data designation action by the system user designating a portion of the user-produced event data for use as an information designator; the portion hereafter referred to as the information designator; the third signal indicating the system user's action of creating an information designator; by presenting a third image in the display area; the third image including a designator display object positioned in a designator location in the display area; the designator display object including display features representing the information designator; and producing an information designator data structure and storing therein the information designator and the designator location of the designator display object in; the designator location indicating the information designator such that the information designator data structure is accessible by the processor when the system user subsequently selects the designator display object in the display area; the system user having the capability of designating any user-produced event data entered in a spatial region as an information designator.

9. The system of claim 8 wherein the processor, further in executing the instructions, responds to a fourth signal from the user input device indicating the system user's action of associating a selected information designator with a target spatial region; the fourth signal including a selection action selecting a designator display object as a selected information designator and a designator target action indicating a target spatial region in the display area; the processor responding by presenting a fourth image in the display area; the fourth image including display features representing the selected information designator and being presented in the target spatial region in the display area; and modifying the address zone data structure represented by the target spatial region to include the selected information designator such that the user-produced event data and the user-requested address value stored in the address zone data structure of the target spatial region are accessible by the processor and retrievable by the system user using the selected information designator; the selected information designator in the address zone data structure of the target spatial region providing access to recorded event data at the recording address value correlated with the user-requested address value of the target spatial region.

10. The system of claim 8 wherein the processor, in executing the instructions, further responds to the third signal from the user input device indicating the data designation action by the system user by assigning a unique information designator identifier to the information designator, and by storing the unique information designator identifier in the information designator data structure such that a selected information designator may be retrieved from an information designator data structure using the designator location thereof or using the unique information designator identifier thereof; and wherein the processor, further in executing the instructions, responding to a fourth signal from the user input device indicating the system user's action of associating a selected information designator with a target spatial region; the fourth signal including a selection action selecting a unique information designator identifier as a selected information designator identifier and a designator target action indicating a target spatial region in the display area; the processor responding by presenting a fourth image in the display area; the fourth image including display features representing the selected information designator identifier and being presented in the target spatial region in the display area; and modifying the address zone data structure represented by the target spatial region to include the selected information designator identifier such that the user-produced event data and the user-requested address value stored in the address zone data structure of the target spatial region are accessible by the processor and retrievable by the system user using the selected information designator identifier; the selected information designator identifier in the address zone data structure of the target spatial region providing access to recorded event data at the recording address value correlated with the user-requested address value of the target spatial region.

11. The system of claim 10 wherein the processor, further in responding to the fourth signal, modifies the information designator data structure of the selected information designator identifier to indicate the user-requested address value stored in the address zone data structure of the target spatial region such that, when the system user associates a selected information designator identifier with a respective spatial region, all user-requested address values of all spatial regions having the selected information designator associated therewith are accessible to the processor and retrievable by the system user; the processor using user-requested address values indicated by an information designator data structure to access recording address values matching the user-requested address values to present recorded event data correlated therewith.

12. The system of claim 11 further including an output device suitable for presentation of the plurality of signals indicating the recorded event data stored on the storage medium; the output device being connected for receiving operational signals from the processor for operating the output device to present to the system user the recorded event data stored on the storage medium; and wherein the processor, further in executing the instructions, when recording of the event has terminated, responding to a fifth signal from the user input device indicating the system user's action to retrieve recorded event signals using an unique information designator identifier, the fifth signal including a selection action selecting the display features representing a selected information designator identifier; the processor responding to the fifth signal by obtaining a user-requested address value from the information designator data structure using the selected information designator identifier; and operating the output device to obtain from the storage medium and present the plurality of signals indicating the recorded event data indicated by a recording address value nearest in value to the user-requested address value; the recorded event data being automatically correlated with a respective information designator associated with a spatial region when the system user associates a selected information designator identifier indicating the respective information designator with the spatial region.

13. A processor-controlled machine for synchronizing recorded data to information entered into the machine by a machine user; the machine including a user input device for producing signals indicating actions of a machine user;

a display having a display area for presenting images;

a processor connected for receiving the signals from the user input device, and connected for providing images to the display;

a storage medium access device in communication with a storage medium adapted for storing thereon a plurality of signals indicating recorded data; the recorded data being stored on the storage medium with a plurality of time data items indicating recording time values; each recording time value being stored such that the recording time value indicates a portion of the recorded data;

a clock source connected for providing time data items to the processor; the clock source being synchronized with the storage medium access device such that a time data item provided by the clock source indicates a time value equal to a recorded time value stored with the recorded data on the storage medium when the storage medium access device is accessing the recorded data; and memory for storing data; the data stored in the memory including instruction data indicating instructions the processor executes;

the processor being further connected for accessing the data stored in the memory;

the processor, in executing the instructions, responding to a first signal from the user input device indicating a request from the machine user to obtain a user-requested time value from the clock source by accessing the clock source and obtaining a time data item indicating the user-requested time value;

presenting a first image in the display area; the first image including a time zone display feature positioned at a time marking location in the display area such that the time zone display feature is perceived by the machine user as marking a spatial region, referred to as a time zone, in the display area; and producing a time zone data structure for storing in the memory of the machine and storing the time data item and the time marking location therein; the time zone data structure being represented by the time zone in the display area and being accessible by the processor using either the time marking location indicating the time zone or the time data item indicating the user-requested time value;

the storage medium access device accessing the storage medium at a recorded time value equal to the user-requested time value when the processor obtains the user-requested time value;

the processor, further in executing the instructions, responding to a second signal from the user input device indicating user-produced data entered by the machine user in a time zone by presenting a second image in the time zone; the second image including display features representing the user-produced data entered by the machine user; and storing the user-produced data in the time zone data structure represented by the time zone such that all of the user-produced data entered by the machine user within the time zone marked in the display area is accessible by the processor in the time zone data structure using the user-requested time value obtained when the time zone data structure was first produced;

the user-produced data stored in a time zone data structure being synchronized with the portion of the recorded data indicated by the recording time value being accessed by the storage medium access device when the user-requested time value was first obtained and the time zone data structure was first produced.

14. The processor-controlled machine of claim 13 wherein the processor, further in executing instructions responding to the first signal indicating the request from the machine user, causes the first image to further include display features representing the user-requested time value positioned in the time zone so that the user-requested time value is perceived by the machine user as being associated with the time zone.

15. The processor-controlled machine of claim 13 wherein the storage medium access device is a signal presentation device adapted for presenting the plurality of signals indicating the recorded data stored on the storage medium in a manner perceivable by the machine user; the recorded data having been stored on the storage medium prior to the machine user first requesting a user-requested time value, and being referred to as previously recorded data; the signal presentation device currently presenting the previously recorded data;

wherein the time data items provided to the processor by the clock source are recording time values previously stored on the storage medium with the previously recorded data being presented to the machine user by the signal presentation device; and wherein the user-produced data stored in a time zone data structure is synchronized with a portion of the previously recorded data indicated by the recording time value being accessed by the signal presentation device when the user-requested time value was first obtained and the time zone data structure was first produced.

16. The machine of claim 15 wherein the signal presentation device is adapted to presenting image signals; wherein the plurality of signals indicating the previously recorded data stored on the storage medium is a plurality of previously recorded images being presented on the signal presentation device and observed by the machine user; the user-produced data entered by the machine user and stored in the time zone data structure being synchronized with a portion of previously recorded image data.

17. The machine of claim 16 wherein the previously recorded image data represent video images.

18. The machine of claim 16 wherein the signal recording device is adapted to recording image signals; wherein the plurality of signals indicating the recorded data stored on the storage medium is a plurality of recorded images being recorded on the signal recording device; the user-produced data entered by the machine user and stored in the time zone data structure being synchronized with a portion of recorded image data.

19. The machine of claim 18 wherein the recorded image data represent video images.

20. The machine of claim 15 wherein the signal presentation device is adapted to presenting audio signals; wherein the plurality of signals indicating the previously recorded data stored on the storage medium is a plurality of previously recorded sounds being presented on the signal presentation device and heard by the machine user; the user-produced data entered by the machine user and stored in the time zone data structure being synchronized with a portion of previously recorded audio data.

21. The processor-controlled machine of claim 13 wherein the storage medium access device is a signal recording device adapted for recording the plurality of signals indicating the recorded data stored on the storage medium; the signal recording device currently recording the recorded data; the recorded data being stored on the storage medium as the machine user requests user-requested time values and as time zone data structures are produced;

wherein the time data items provided to the processor by the clock source are recording time values indicated by the signal recording device and being stored on the storage medium with the recorded data being recorded by the signal recording device; and wherein the user-produced data stored in a time zone data structure is being synchronized with a portion of recorded data indicated by the recording time value being recorded with the recorded data by the signal recording device at the time a user-requested time value is obtained and the time zone data structure is first produced.

22. The machine of claim 21 wherein the signal recording device is adapted to recording audio signals; wherein the plurality of signals indicating the recorded data stored on the storage medium is a plurality of recorded sounds being recorded on the signal recording device; the user-produced data entered by the machine user and stored in the time zone data structure being synchronized with a portion of recorded audio data.

23. The machine of claim 13 wherein the user input device for providing the signals indicating the actions of the machine user is a stylus device connected for interacting with the display to produce the signals in the form of a handwritten stroke.

24. The machine of claim 23 wherein the processor, in executing the instructions for storing the user-produced data in the time zone data structure, stores signals indicating the stroke entered on the surface of the display by the machine user using the stylus device.

25. The machine of claim 24 wherein the signals indicating the stroke entered on the surface of the display by the machine user using the stylus device and stored as the user-produced data indicate image definition data defining the display features representing the user-produced data entered by the machine user and included in the second image.

* * * * *